United States Patent
Foskey

(10) Patent No.: US 11,753,167 B2
(45) Date of Patent: Sep. 12, 2023

(54) MODULAR DEPLOYABLE EXTERNAL PASSENGER SYSTEM FOR AIRCRAFT

(71) Applicant: Bell Textron Inc., Fort Worth, TX (US)

(72) Inventor: Christopher Edward Foskey, Keller, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 350 days.

(21) Appl. No.: 17/112,446

(22) Filed: Dec. 4, 2020

(65) Prior Publication Data
US 2022/0169389 A1 Jun. 2, 2022

Related U.S. Application Data

(60) Provisional application No. 63/119,300, filed on Nov. 30, 2020.

(51) Int. Cl.
*B64D 11/06* (2006.01)
*E05F 15/622* (2015.01)
*B64C 1/14* (2006.01)

(52) U.S. Cl.
CPC ........ *B64D 11/0601* (2014.12); *B64C 1/1415* (2013.01); *B64C 1/1461* (2013.01); *B64D 11/064* (2014.12); *E05F 15/622* (2015.01); *E05Y 2900/502* (2013.01)

(58) Field of Classification Search
CPC ............ B64D 11/0601; B64D 11/0639; B64D 11/0698; B64D 2011/0092; B64C 1/1415; B64C 1/1438; B60N 2002/0256; B64F 1/31
See application file for complete search history.

(56) References Cited

U.S. PATENT DOCUMENTS

| | | | | |
|---|---|---|---|---|
| 3,419,164 A * | 12/1968 | O'Neill | ...................... | B64F 1/31 280/424 |
| 3,718,171 A * | 2/1973 | Godwin | ................ | B64C 1/1415 244/129.5 |
| 4,637,575 A * | 1/1987 | Yenzer | ..................... | H02G 1/02 244/137.1 |
| 5,181,677 A * | 1/1993 | Kaplan | ................. | B64C 1/1438 244/129.4 |
| 5,779,296 A * | 7/1998 | Hewko | ................ | A61G 3/0866 244/118.6 |
| 6,108,976 A * | 8/2000 | Kato | ....................... | E05F 15/00 49/352 |

(Continued)

FOREIGN PATENT DOCUMENTS

| | | | | |
|---|---|---|---|---|
| BR | 8303488 U | * | 2/2006 | |
| FR | 2922437 A1 | * | 4/2009 | ............... A61G 1/04 |
| WO | WO-9616867 A1 | * | 6/1996 | ............... A61G 3/06 |

*Primary Examiner* — Richard Green
*Assistant Examiner* — Madison Elizabeth Dittner
(74) *Attorney, Agent, or Firm* — Akona IP

(57) ABSTRACT

An embodiment is a system including an external passenger seating unit comprising at least one seat; and a translation mechanism for translating the external passenger seating unit between a first position in which the external passenger seating unit is stowed in a payload bay of an aircraft and a second position in which the external passenger seating unit is deployed external to the aircraft for accommodating at least one passenger.

20 Claims, 27 Drawing Sheets

(56) References Cited

U.S. PATENT DOCUMENTS

| | | | | |
|---|---|---|---|---|
| 6,158,692 | A * | 12/2000 | Abild | B64C 1/1415 |
| | | | | 244/129.5 |
| 6,585,188 | B2 * | 7/2003 | Alli | B64D 9/00 |
| | | | | 244/118.6 |
| 7,201,349 | B2 * | 4/2007 | Lavie | A61G 3/001 |
| | | | | 244/118.5 |
| 8,033,605 | B2 * | 10/2011 | Miura | B60N 2/2893 |
| | | | | 297/344.14 |
| 8,074,930 | B2 * | 12/2011 | Sibley | B64C 1/1407 |
| | | | | 244/129.4 |
| 8,292,229 | B2 * | 10/2012 | Pancotti | B64C 1/1415 |
| | | | | 244/17.11 |
| 9,956,126 | B2 * | 5/2018 | Russell | A61G 3/00 |
| 2020/0038268 | A1 * | 2/2020 | Shrapnel | A61G 3/0245 |

\* cited by examiner

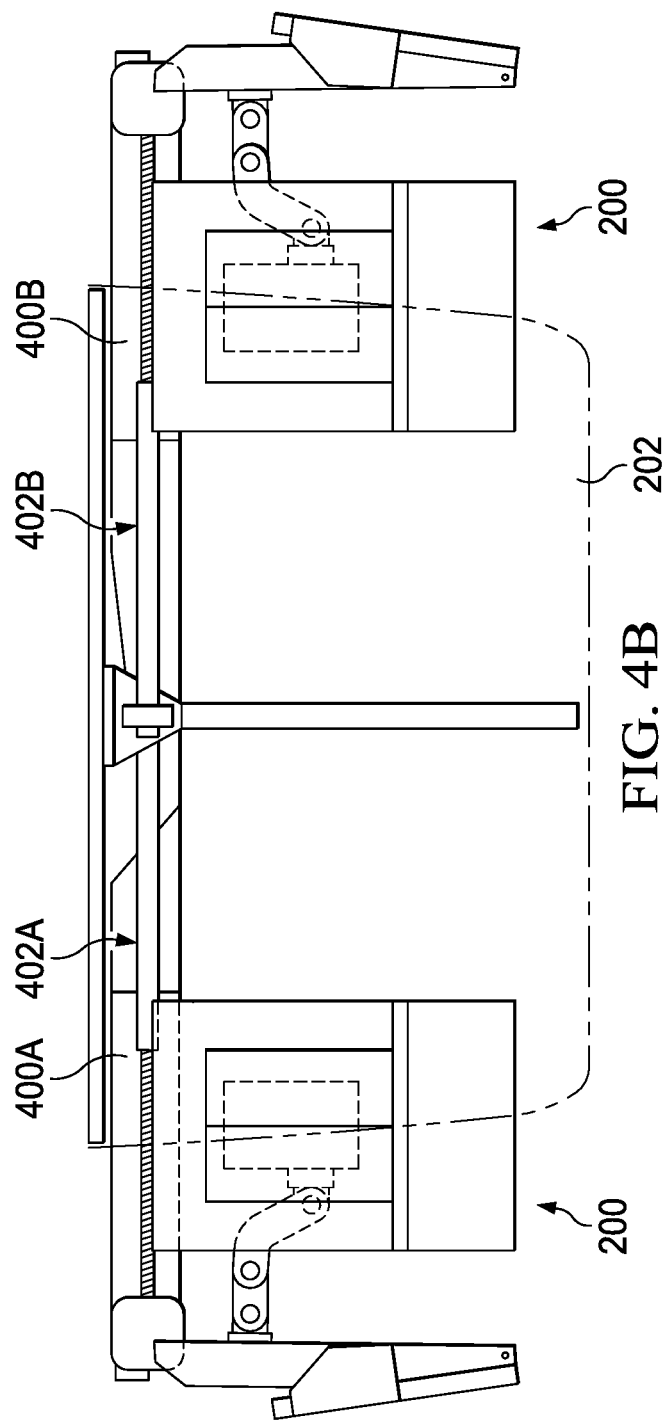

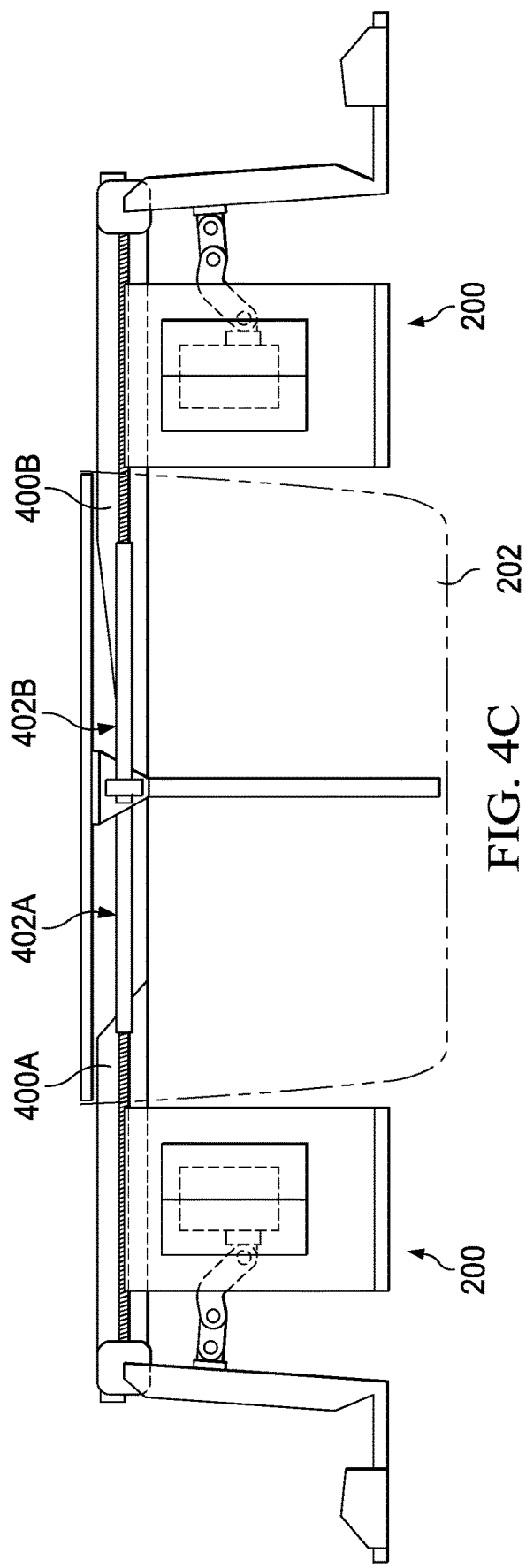

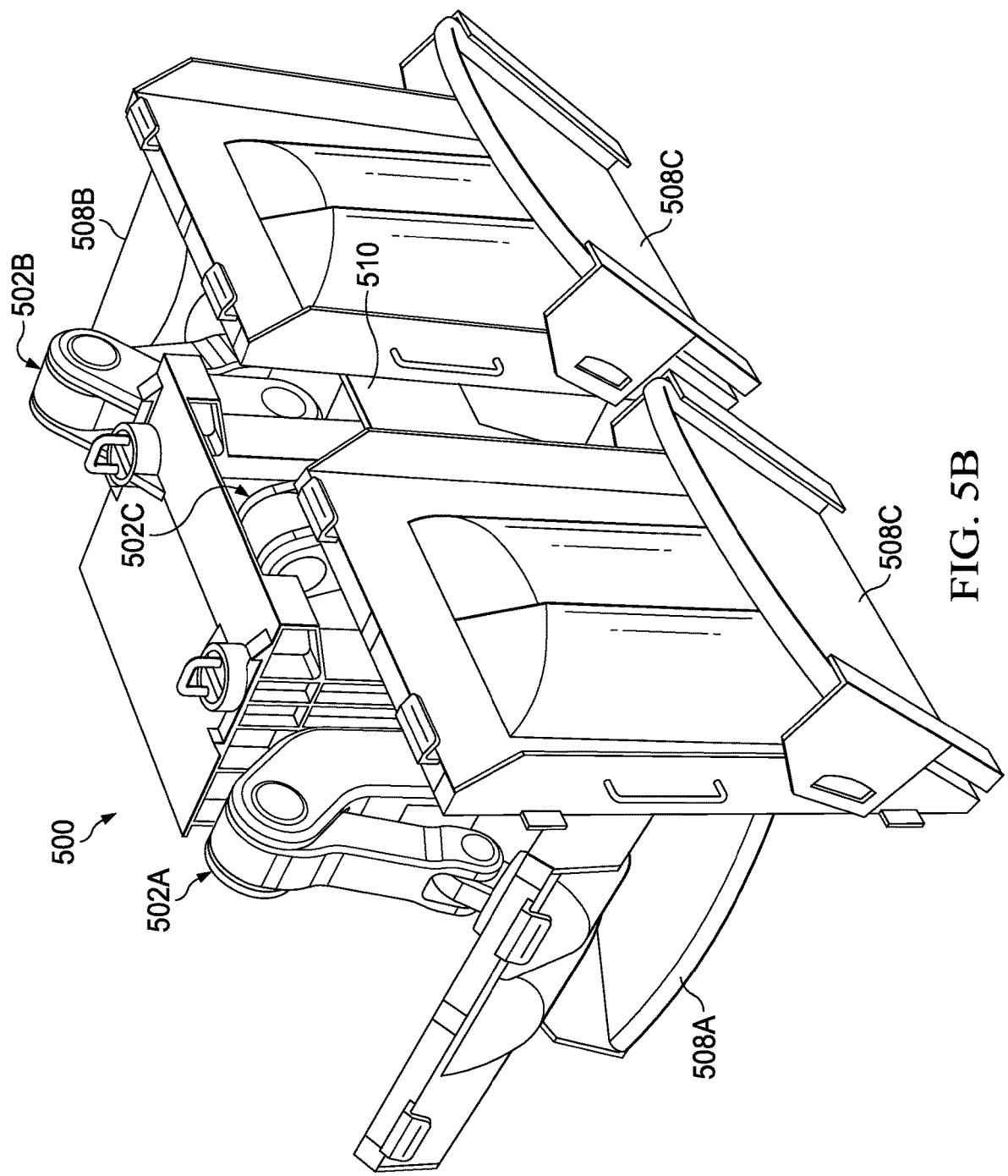

MODULAR DEPLOYABLE EXTERNAL PASSENGER SYSTEM FOR AIRCRAFT

CROSS-REFERENCE TO RELATED APPLICATION

This application claims the benefit of and priority to U.S. Patent Application Ser. No. 63/119,300, filed Nov. 30, 2020, entitled "MODULAR DEPLOYABLE EXTERNAL PASSENGER SYSTEM FOR AIRCRAFT," which is incorporated herein by reference in its entirety.

TECHNICAL FIELD

This disclosure relates generally to aircraft having external passenger seating and, more particularly, to a modular deployable external passenger system (MDEPS) for such aircraft.

SUMMARY

One embodiment is a system including an external passenger seating unit comprising at least one seat; and a translation mechanism for translating the external passenger seating unit between a first position in which the external passenger seating unit is stowed in a payload bay of an aircraft and a second position in which the external passenger seating unit is deployed external to the aircraft for accommodating at least one passenger.

Another embodiment is an aircraft comprising a fuselage; a payload bay disposed within the fuselage; an external passenger seating unit comprising at least one seat; and a translation mechanism for translating the external passenger seating unit between a first position in which the external passenger seating unit is contained within the payload bay and a second position in which the external passenger seating unit is deployed external to the fuselage for accommodating at least one passenger.

Yet another embodiment is a modular deployable external passenger seating ("MDEPS") unit comprising at least one seat and a mechanism for connecting the MDEPS to a translation assembly for translating the MDEPS between a first position in which the MDEPS is stowed in a payload bay of an aircraft and a second position in which the MDEPS is deployed external to the aircraft for accommodating at least one passenger.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIGS. 4A-4C are front cut-away views of a portion of the aircraft of FIG. 1 illustrating operation of embodiments described herein for extending the MDEPS from and retracting the MDEPS into the payload bay of the aircraft.

FIGS. 5A-5C illustrate additional details of an example MDEPS unit in accordance with embodiments described herein;

FIGS. 9A-1, 9A-2, 9B, and 9C illustrate an MDEPS in accordance with alternative embodiments of the present disclosure;

DETAILED DESCRIPTION

Figure 1A:
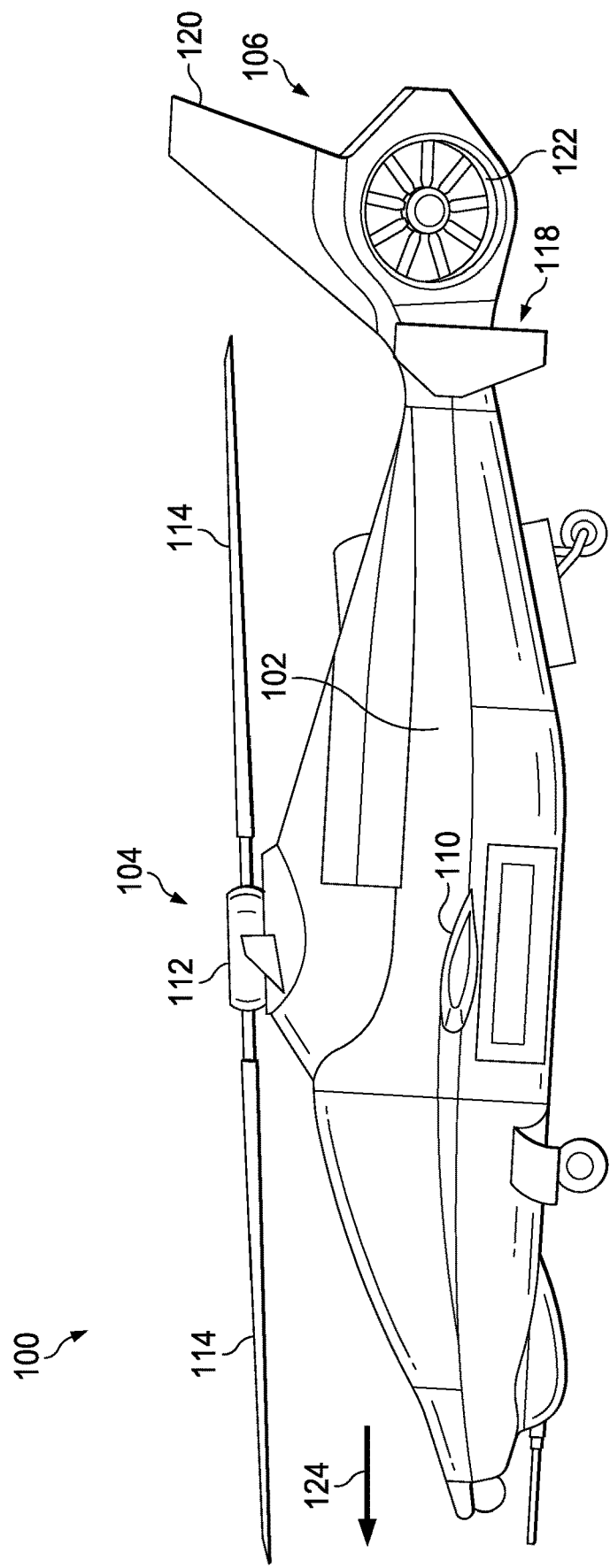
FIG. 1A illustrates a side view of an example aircraft in which a modular deployable external passenger system (MDEPS) in accordance with certain embodiments of the present disclosure may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Embodiments described herein provide a modular deployable external passenger system (MDEPS) that mounts to the bomb release unit (BRU) and air launched effect (ALE) launcher rack. In one embodiment, the MDEPS includes a fully internally stowable external passenger seating unit affixed to articulating mounts. In an alternative embodiments, the MDEPS includes a fully internally stowable external passenger seating and litter kit unit affixed to articulating mounts.

Historically, many smaller scout and attack helicopters have not typically included a robust solution for adding passenger carrying capability. Embodiments described herein enable such aircraft to carry up to eight passengers (or four passengers and two litters) externally via units that are internally stowable within an ALE cargo envelope when not in use for stowing ALEs.

In certain embodiments, a combination of triple joint articulating arms and a pivoting, tracked outer framework are mounted to a structural base frame that hangs from a standard BRU, which may be implemented in lieu of an AGM-114 multiple launcher platform or other similar armament or launcher system. The deploy and stow motion could be optionally actuated manually using a system of pretensioned springs as an assist mechanism, or alternately could be fully independently powered and therefore automatically deployed or stowed.

Referring to FIG. 1A, illustrated therein is an example embodiment of an aircraft, which in the illustrated example is a rotorcraft 100. FIG. 1A portrays a side view of rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of embodiments described herein, the fuselage 102 also includes a payload bay covered by a payload bay door 108 disposed under a wing 110, which in some embodiments includes a support structure and actuation mechanism for extending externally stowed payload (e.g., MDEPS units) outboard away from the fuselage 102 for use. It will be recognized that, although not shown in the view illustrated in FIG. 1A, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1A, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100. Wheels 126 are provided and are deployed for supporting the rotorcraft 100 when the rotorcraft is on the ground and retracted into the fuselage 102 when the rotorcraft is in flight.

Figure 1B:
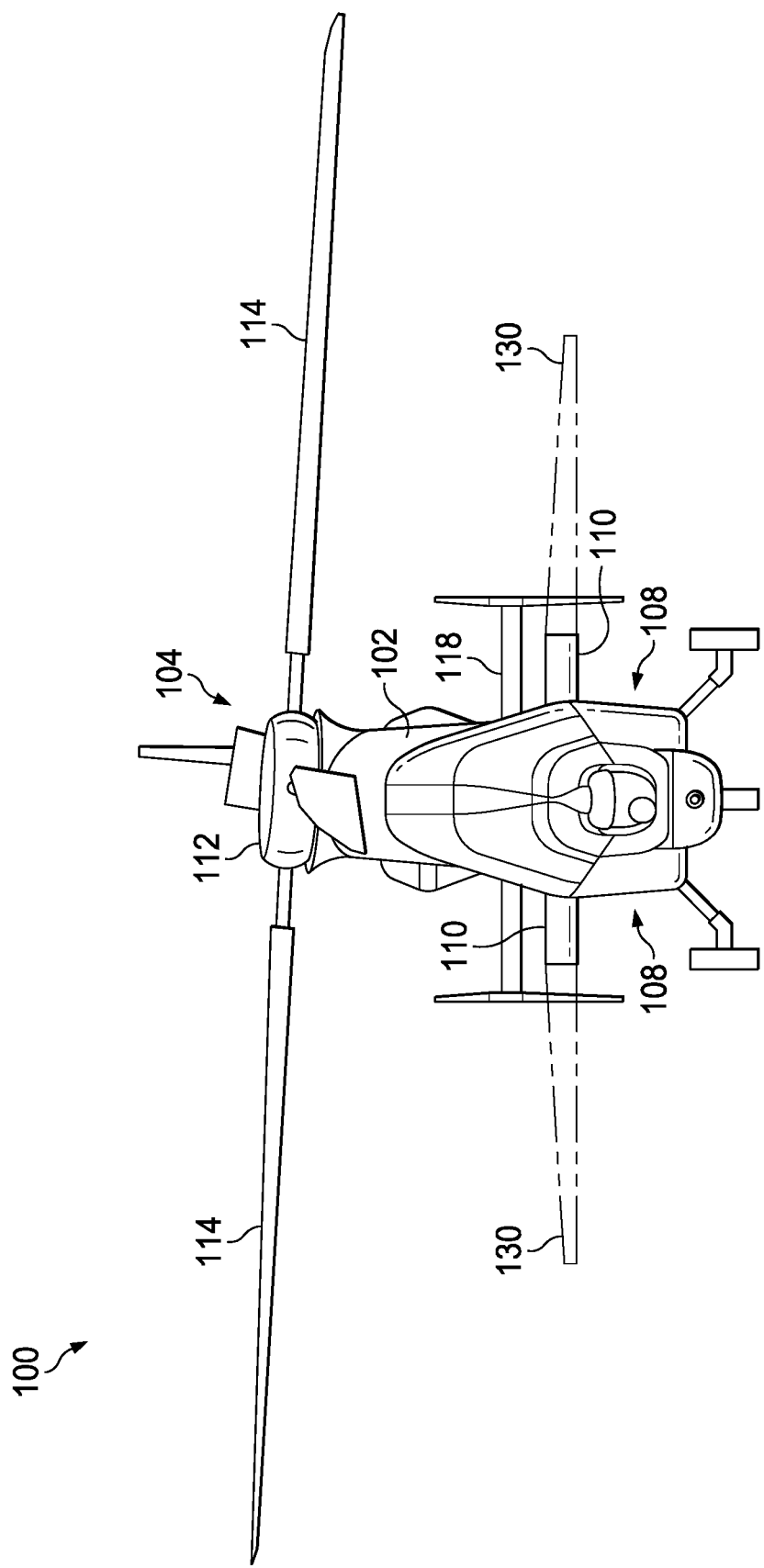
FIG. 1B illustrates a front plan view of the aircraft of FIG. 1 in which the MDEPS is retracted and stowed in payload bay in accordance with features of one embodiment.
Figure 1C:
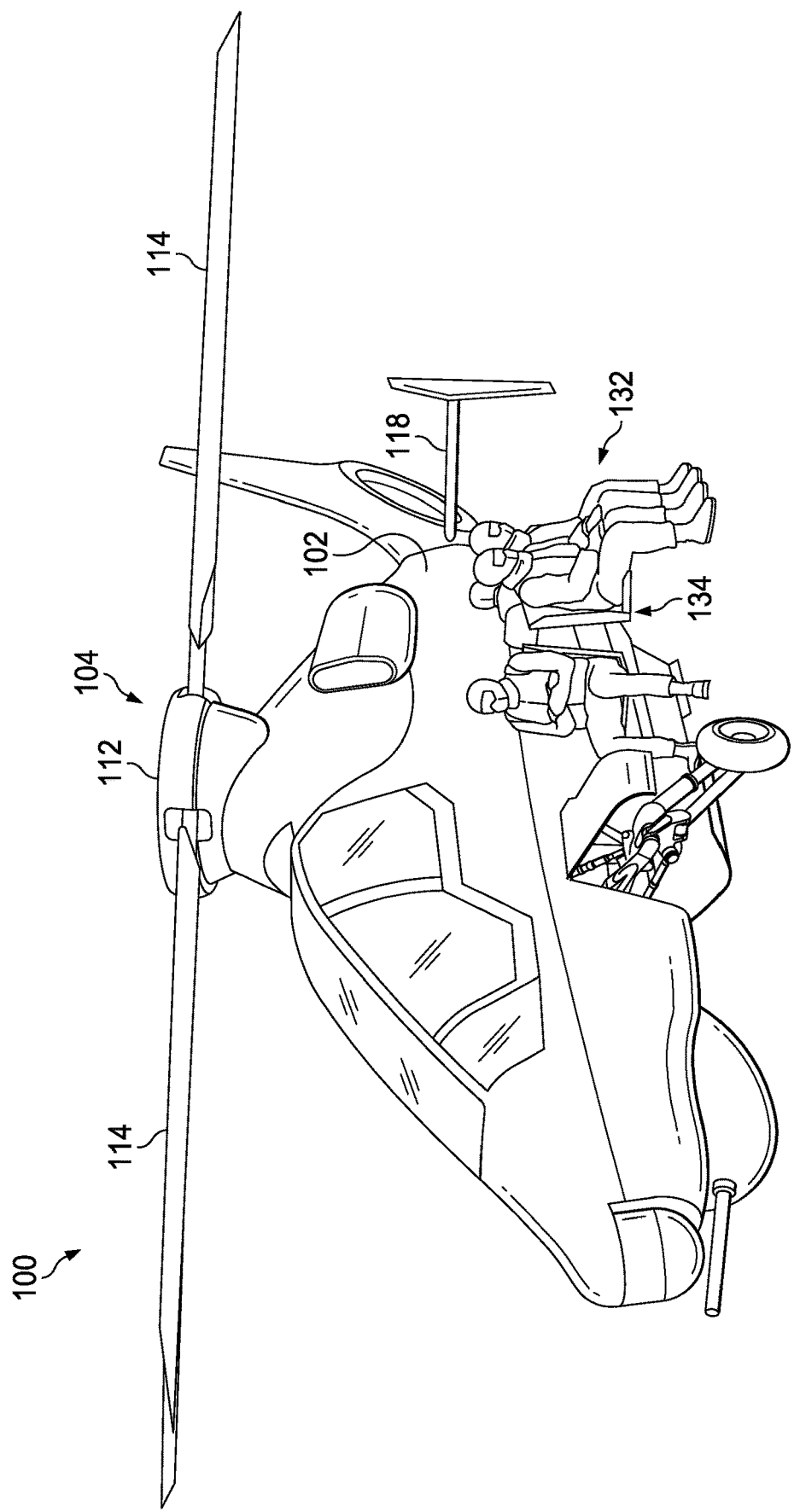
FIG. 1C illustrates a perspective view of the aircraft of FIG. 1 in which the MDEPS is deployed from the payload bay for use in accommodating multiple passengers in accordance with features of one embodiment.

FIG. 1B illustrates a front plan view of the rotorcraft 100 of FIG. 1A. As shown in FIG. 1B, outboard ends 130 of wings 110 are optionally been removed such that the wings 110 are basically winglets. As shown in FIG. 1C, which illustrates a perspective view of the rotorcraft 100 (FIG. 1A), this configuration (i.e., removal of outboard ends 130) enables passengers 132 to be seated on one or more outboard-facing seats 134 provided on each side of the rotorcraft 100, as will be described in greater detail hereinbelow.

Figure 2:
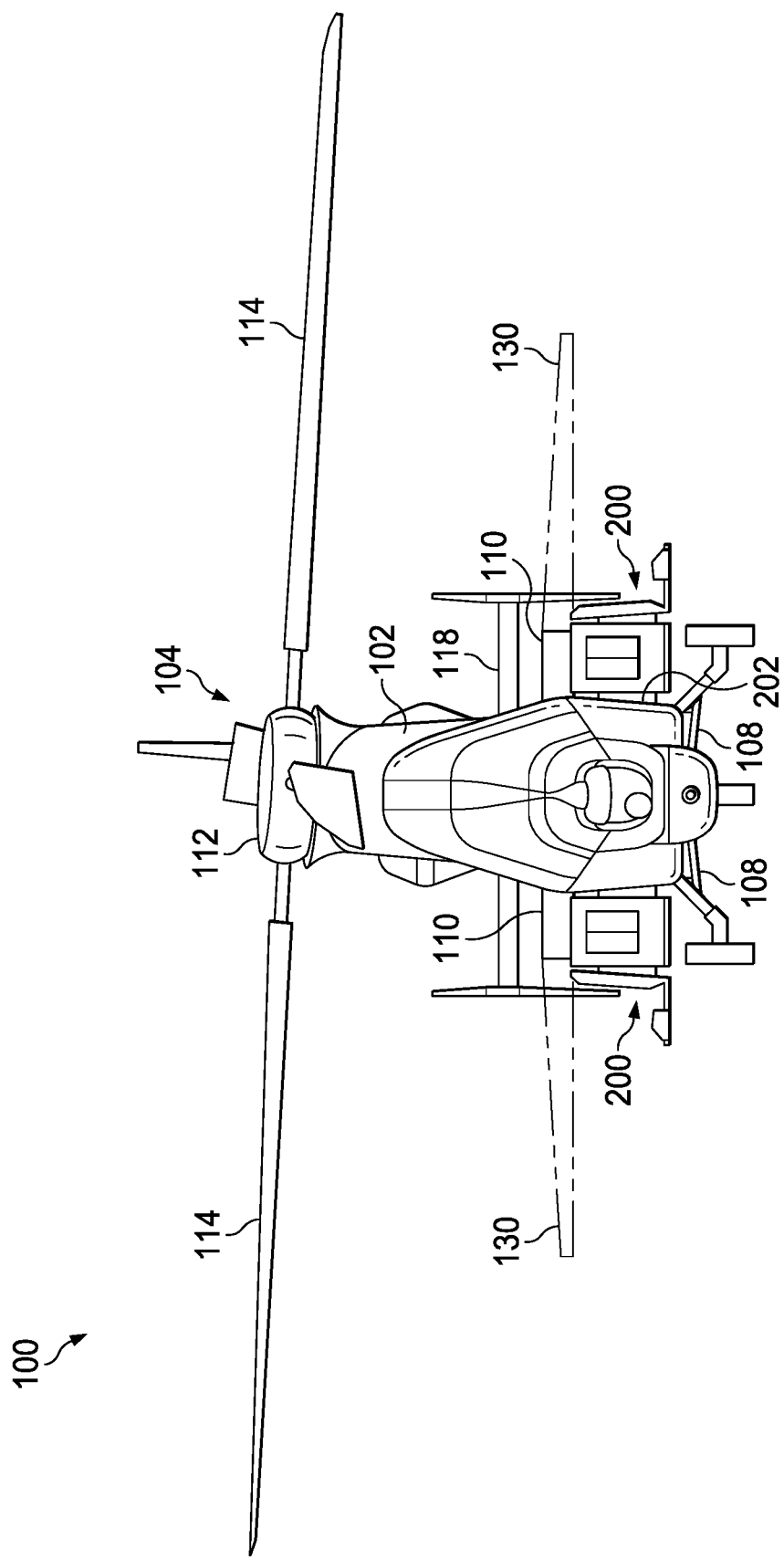
FIG. 2 illustrates a front plan view of the aircraft of FIG. 1 in which the MDEPS is deployed from the payload bay in accordance with features of one embodiment.

FIG. 1B illustrates the rotorcraft 100 in a first condition in which the payload bay doors 108 are closed and MDEPS units (not shown in FIG. 1B) are stowed within the payload bay. FIG. 2 illustrates the rotorcraft 100 in a second condition in which the payload bay doors 108 are open and MDEPS units 200 are extended from opposite sides of rotorcraft 100 beneath the wings 110. In the illustrated embodiment, each of the MDEPS units includes two outboard-facing seats, a forward-facing seat, and an aft-facing seat, each of which is implemented as a folding seat. In alternative embodiments, the two outboard facing seats may be implemented as a single bench seat. Additionally, any one or more of the seats maybe omitted from the MDEPS unit 200 and any one or more of the seats may include only a seat bottom and not a seat back. As a result, rotorcraft 100 having both MDEPS units 200 deployed is capable of seating up to eight passengers external to the rotorcraft. It will be recognized that in other embodiments, MDEPS units may include more or fewer seats, enabling more or fewer passengers to be correspondingly accommodate.

Figure 3A:
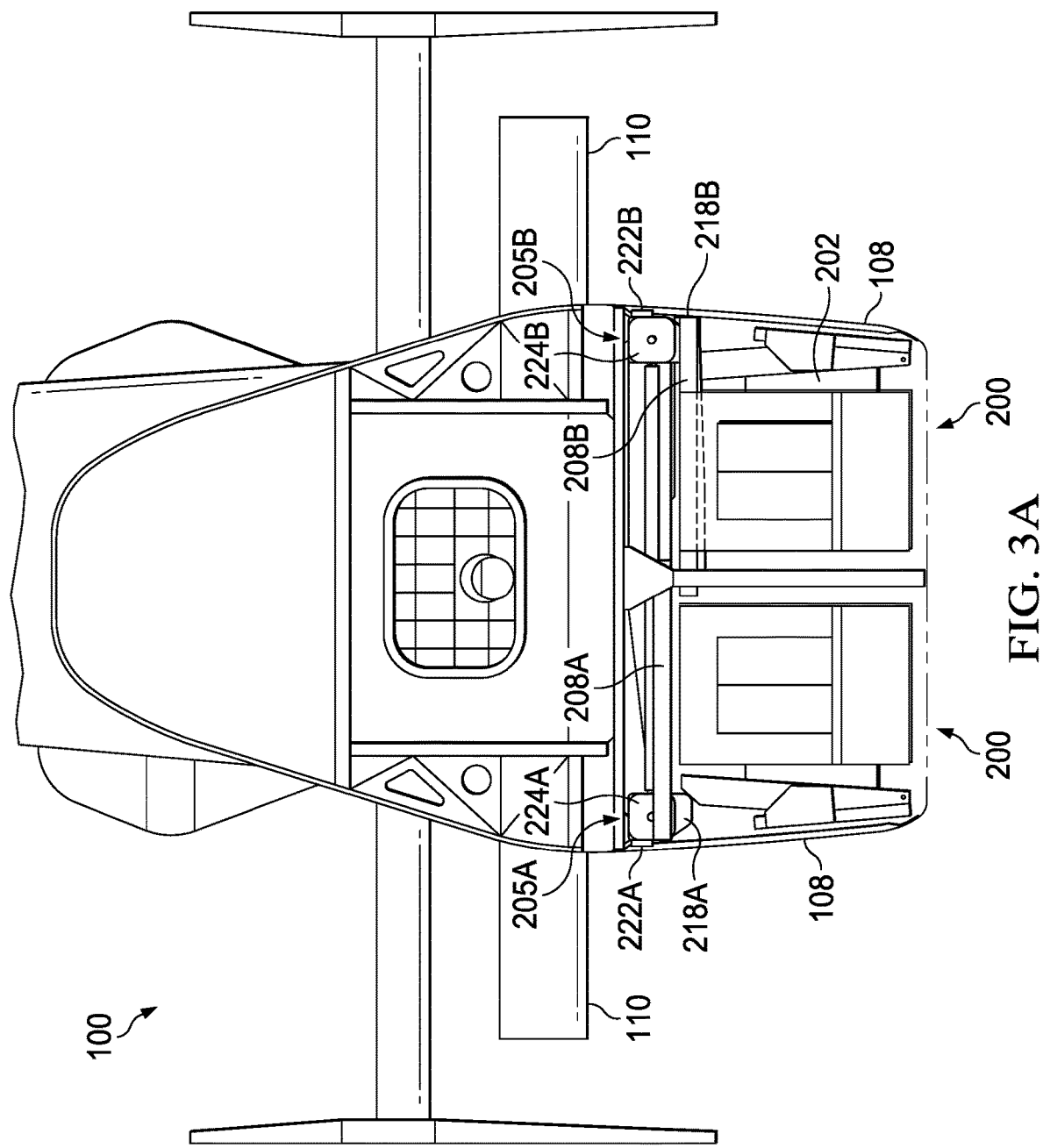
FIG. 3A illustrates a front cut-away view of a portion of the aircraft of FIG. 1 in which the MDEPS is retracted and stowed in the payload bay in accordance with features of one embodiment.
Figure 3B:
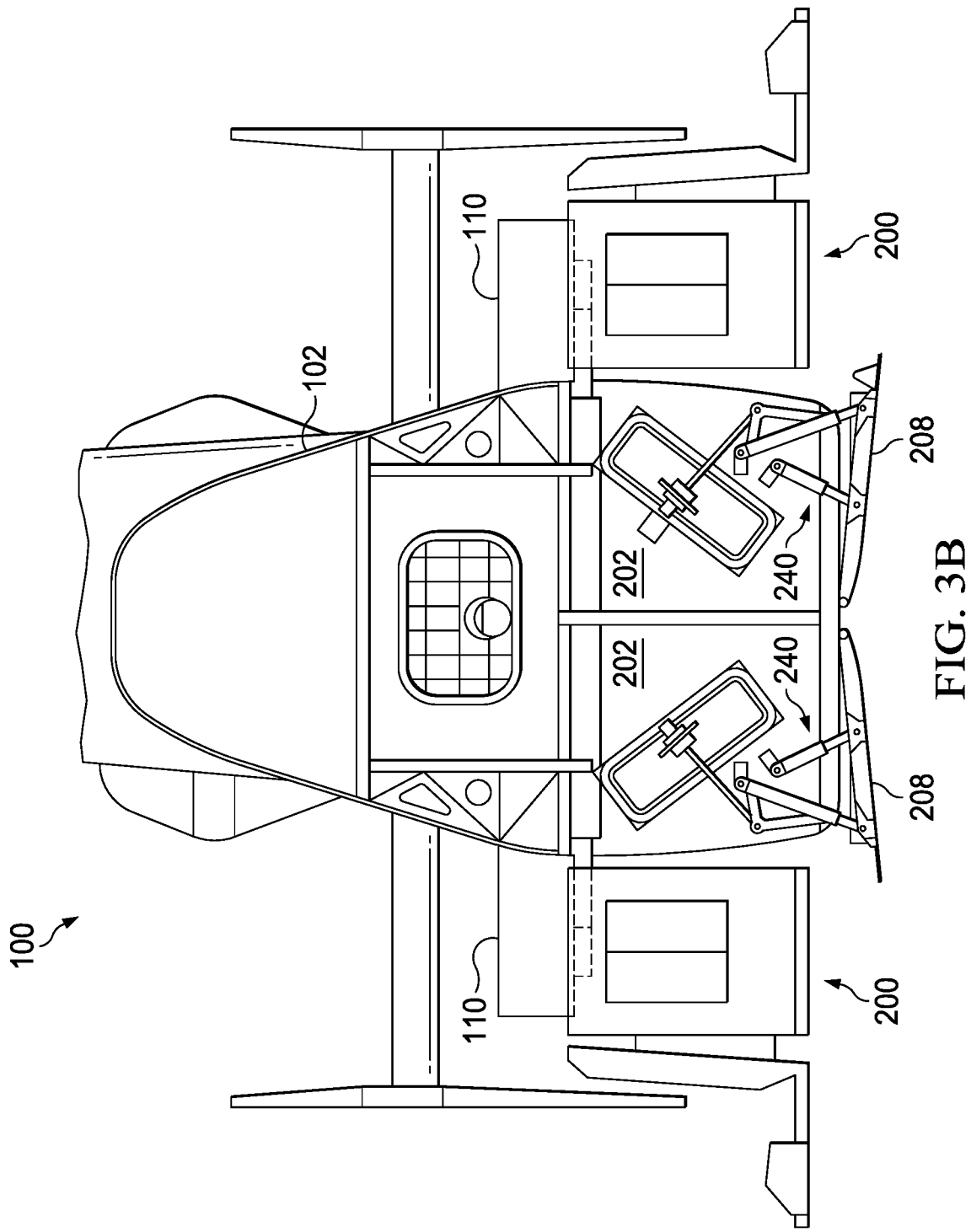
FIG. 3B illustrates a front cut-away view of a portion of the aircraft of FIG. 1 in which the MDEPS is deployed from the payload bay in accordance with features of one embodiment.

Referring now to FIGS. 3A and 3B, illustrated therein are various cutaway views of portions of rotorcraft of FIG. 1A illustrating details of an example mechanism for retracting MDEPS units 200 into a payload bay 202 and extending (or deploying) MDEPS units from the payload bay. At the outset, it should be recognized that the embodiment illustrated in FIGS. 3A and 3B are only one of any number of mechanisms that may be advantageously implemented for deploying and retracting the MDEPS units in connection with embodiments described herein and that the illustrated embodiment is provided for purposes of example only.

In particular, FIG. 3A illustrates a first condition in which MDEPS units 200 are completely retracted and stowed within a payload bay 202 of the rotorcraft 100. FIG. 3B illustrates a second condition in which the payload MDEPS units are completely extended from the payload bay 202 to be used by passengers (not shown in FIG. 3B) As shown in FIG. 3B, rotorcraft 100 may include door actuation mechanisms 204 for opening payload bay doors 108 to allow for extension of MDEPS units and for closing payload bay doors 108 when MDEPS units 200 are retracted into payload bay 202. Additionally, as will be shown and described in greater detail hereinbelow, rotorcraft 100 may include MDEPS actuation mechanisms, or assemblies, for selectively extending MDEPS units 200 out of payload bay 202 and retracting MDEPS units 200 back into payload bay 202.

Referring again to FIG. 3A, in accordance with features of embodiments, described herein, and as will be described in greater detail hereinbelow, the MDEPS units 200 may be driven outboard and inboard by separate and independent MDEPS actuation mechanisms comprising drive mechanisms 205A, 205B mounted on outboard sides of the MDEPS units 200 such that they move inboard and outboard with the respective unit. Linear movement of the units 200 inboard and outboard may be effectuated using actuator mechanisms driven by drive mechanisms 205A, 205B, which may include dual mechanically synchronized ball screws grounded to a keel web via non-rotating ball nuts disposed in grounding shafts. Drive mechanisms 205A, 205B, may include electric power units 218A, 218B, for normal (automated) operation of the actuator assemblies to move units 200 along tracks disposed internal to the payload bay 202. Manual drive inputs 222A, 222B, may be provided in the electric power units 218A, 218B, for enabling manual operation of the actuator assemblies in the absence of power and/or for maintenance. Actuator gearbox assemblies may be connected to actuator power units 218A, 218B, via power shafts 224A, 224B, for driving the ball screws relative to the grounding shafts, resulting in linear motion along the axis of the shafts. Shaft supports may be provided for supporting inboard ends of shafts.

As previously noted, it should be recognized that the MDEPS unit actuation mechanisms illustrated in FIG. 3A are only one of any number of mechanisms that may be advantageously implemented for deploying and retracting the MDEPS units in connection with embodiments described herein and that the illustrated embodiment is provided for purposes of example only.

Figure 4A:
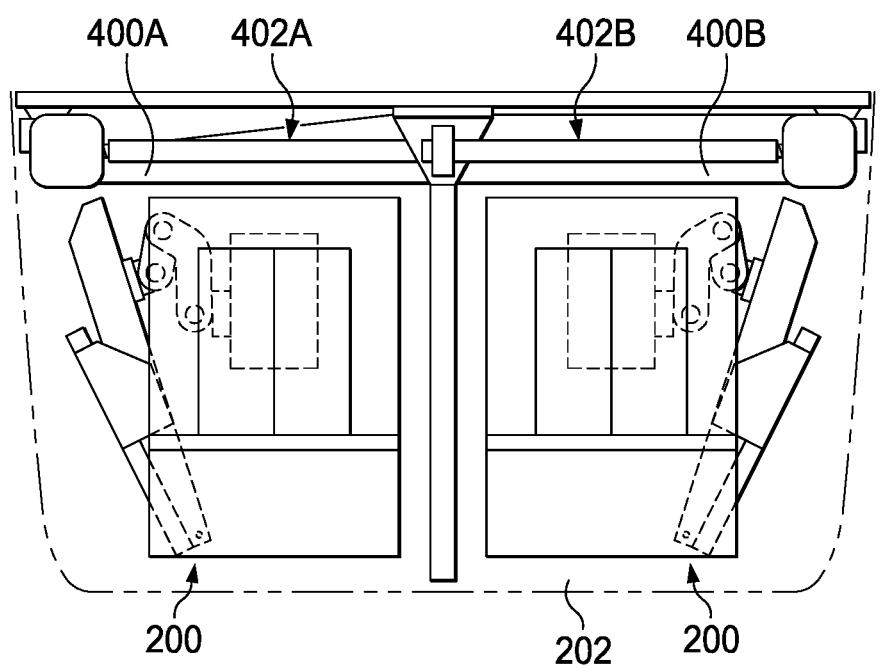
Figure 5A:
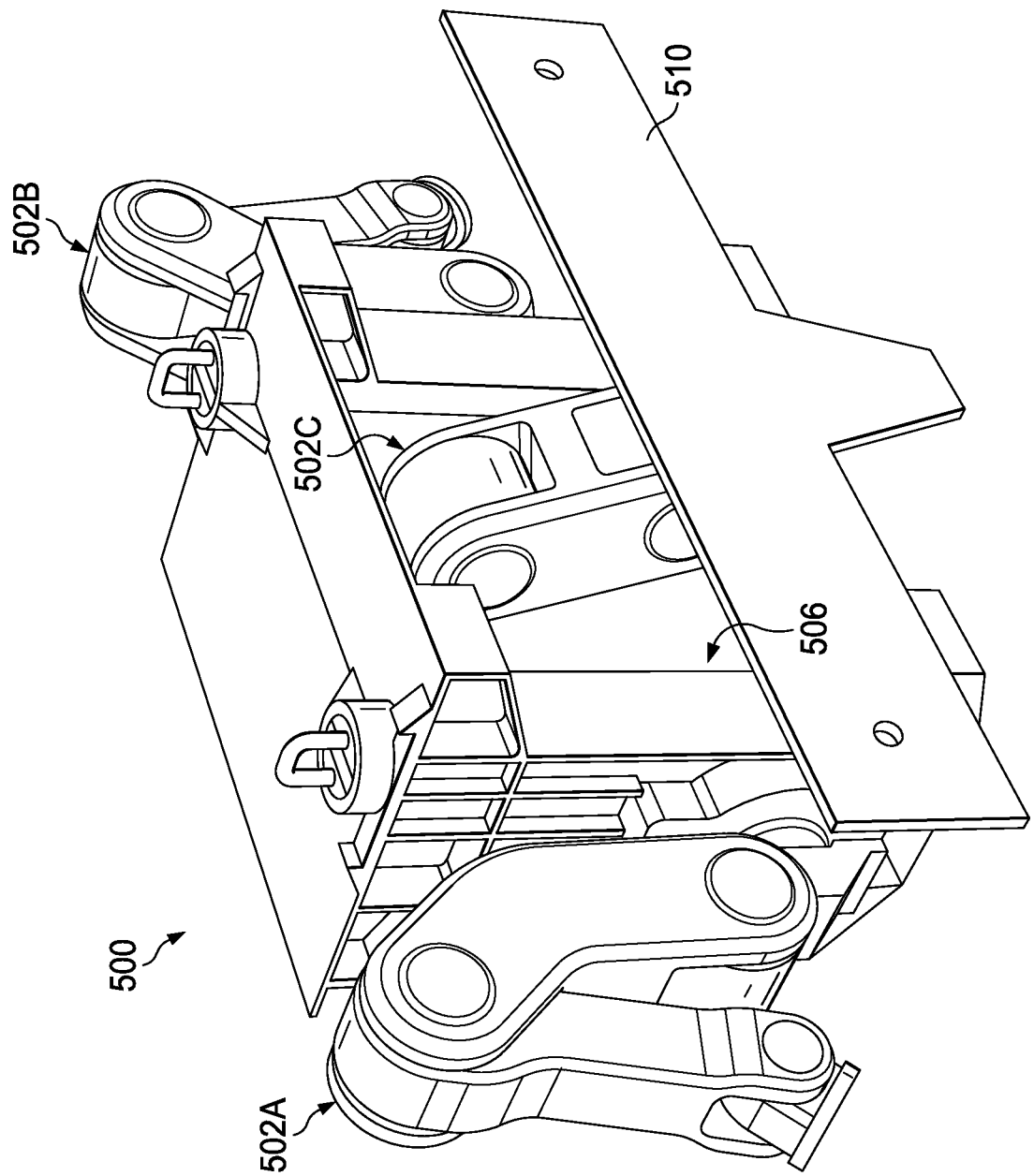
Figure 5C:
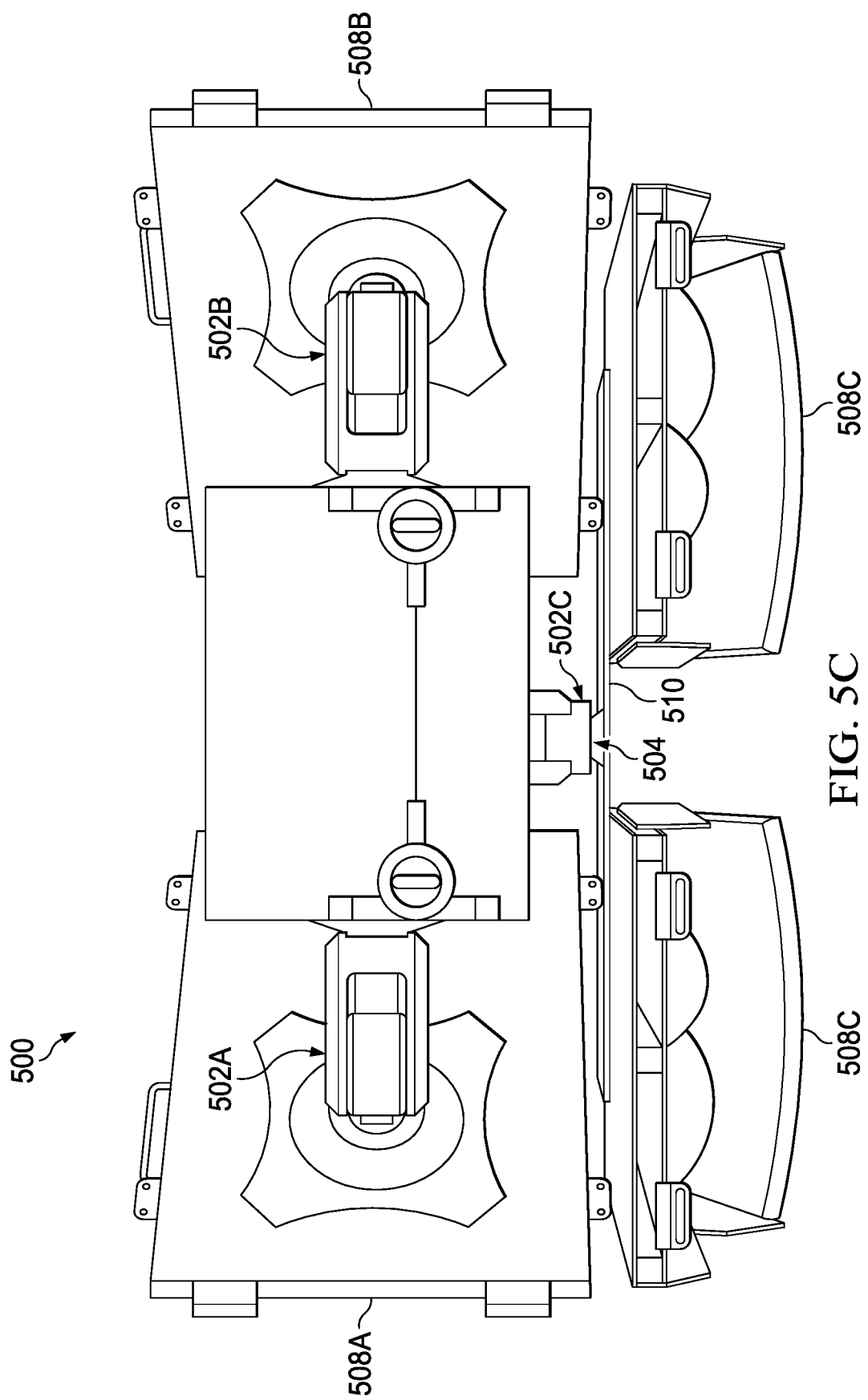

Referring now to FIGS. 4A-4C, deployment of the MDEPS units will be shown and described in greater detail. As shown in FIGS. 4A-4C, actuator gearboxes 400A, 400B, and MDEPS actuator assemblies 402A, 402B, control linear position of the MDEPS units 200 via a ball screw and shaft combination. In FIG. 4A, actuator assemblies 402A, 402B, are extended approximately zero inches. In this condition, or state, the MDEPS units 200 are completely retracted within the payload bay 202 and the seats of the MDEPS units remain in a folded (or closed) position. As will be describe in greater detail herein below, the seats may be held in that position by triple joint actuator arms (FIGS. 5A-5C).

FIG. 4B illustrates a condition in which the actuator assemblies 402A, 402B, are extended some intermediate amount. In this condition, the MDEPS units 200 have begun to be extended out of the payload bay 202 and the seats of MDEPS units may have begun to unfold. Additionally, the articulating arms may result in the overall positioning of the seats being raised somewhat relative to the fuselage. FIG. 4C illustrates a condition in which the actuator assemblies 402A, 402B are fully extended, such that MDEPS units 200 are completely deployed for use and the seats thereof are completely opened and lifted and locked in their final position relative to the fuselage by the articulating arms.

It will be recognized that the linear measurements set forth herein are provided only for the sake of illustrating the overall kinematic operation of one embodiment of the actuator assemblies and that other arrangements may be advantageously employed without departing from the spirit of the scope of the disclosure.

As described above, actuator assemblies may be advantageously implemented using linear ball screw actuator assemblies for translating rotational motion to linear motion using a threaded shaft that provides a helical raceway for ball bearings that act as a precision screw. It will be recognized that other types of actuator assemblies may be employed without departing from the spirit of the scope of the disclosure. As used herein, "actuator" and/or "actuator assembly" refers to a component that is responsible for moving a mechanism or system, such as MDEPS units 200, in response to a control signal from an actuator control system, which in the illustrated embodiments may be incorporated into the aircraft or may be provided from a remote system in communication with the aircraft. The actuator control signal may be an electrical signal, pneumatic pressure, and/or hydraulic pressure, for example. Upon receipt of an actuator control signal, the actuator responds by providing mechanical motion. Although particular types of actuators may be described for use herein, it will be recognized that any number of different types of actuators may be employed, including, but not limited to, hydraulic actuators, pneumatic actuators, electric actuators, coiled polymer actuators, thermal actuators, magnetic actuators, and/or mechanical actuators.

FIGS. 5A-5C illustrate additional details of an example MDEPS unit 500 in accordance with embodiments described herein, which may be used for implementing MDEPS units 200. As shown in FIGS. 5A-5C, a combination of triple joint articulating arms 502A-502C and a pivoting, tracked outer framework 504 (FIG. 5C) to which triple joint articulating arm 502C is connected are mounted to a structural base frame 506 that may hang from a standard BRU platform deployed in a payload bay. Arms 502A and 502B are connected to backs of forward-facing and aft-facing seats 508A, 508B, and arm 502C is connected to backs of outboard-facing seats 508C via a panel 510. As described in greater detail below with reference to FIGS. 10A-10D, 11A-11D, arm deployment options to implement deploy and stow operations illustrated above (particularly in FIGS. 4A-4C) may be actuated manually using a system of pretensioned torsional springs as an assist mechanism and positional locks to maintain the arms in deployed (extended) or stowed (retracted) position. Alternatively, the arm deployment options to implement deploy and stow operations could be fully automated via a self-contained electric device. For example, a battery may be mounted within the frame structure of the MDEPS 500 or alternatively, an umbilical power cord could be provided that is wired back to the airframe to pull power from aircraft systems. Additionally and/or alternatively, rotary joints of the arms 502A-502C may include rotary actuators installed therein for each pivot point and linear actuators or additional ball screws could be used for the linear (up-down) movement of the outboard seats.

Figure 6A:
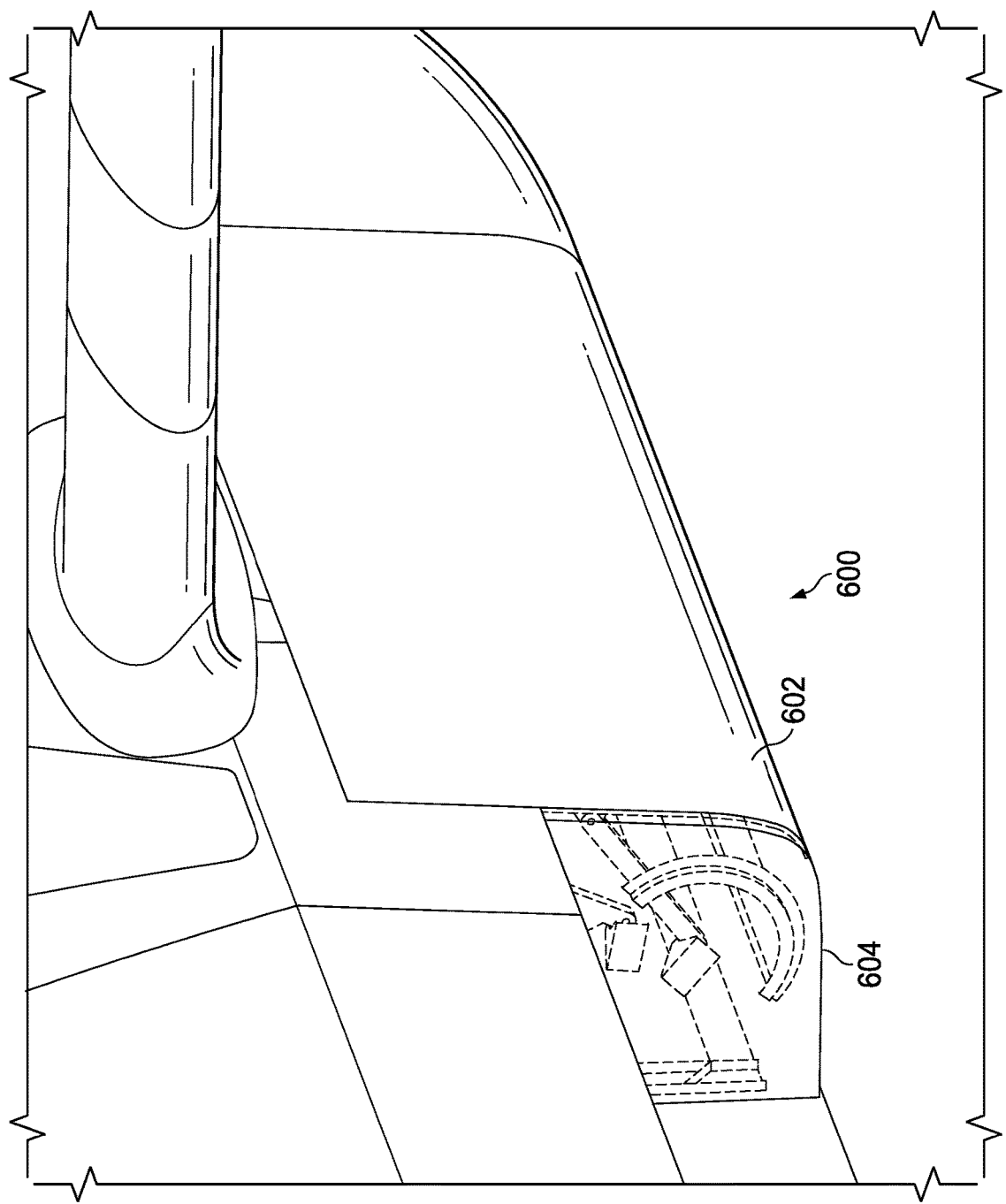
FIGS. 6A-6C, FIG. 7, and FIGS. 8A-8B illustrate an example payload door mechanism for use in connection with the MDEPS in accordance with embodiments described herein.
Figure 6B:
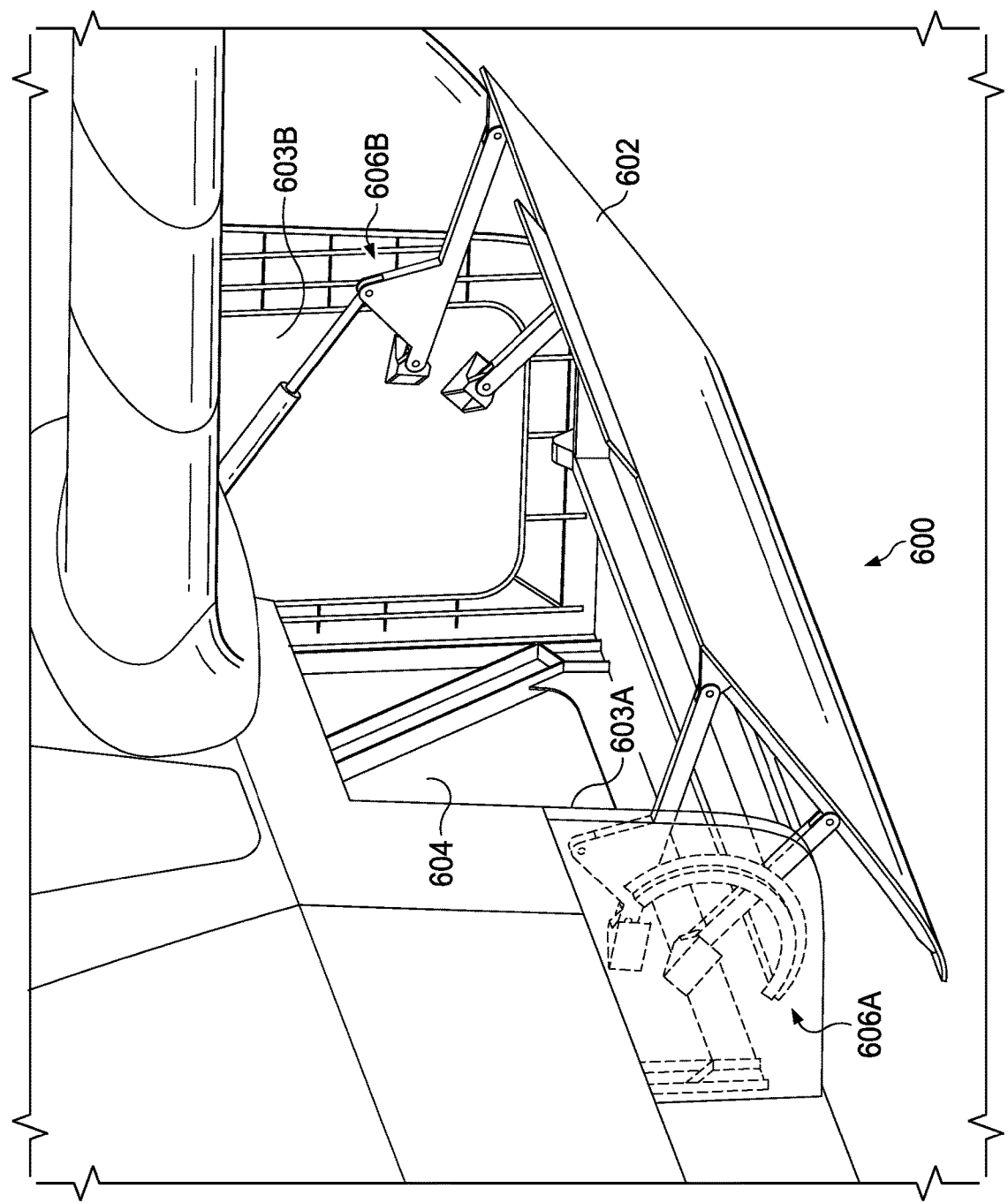
Figure 6C:
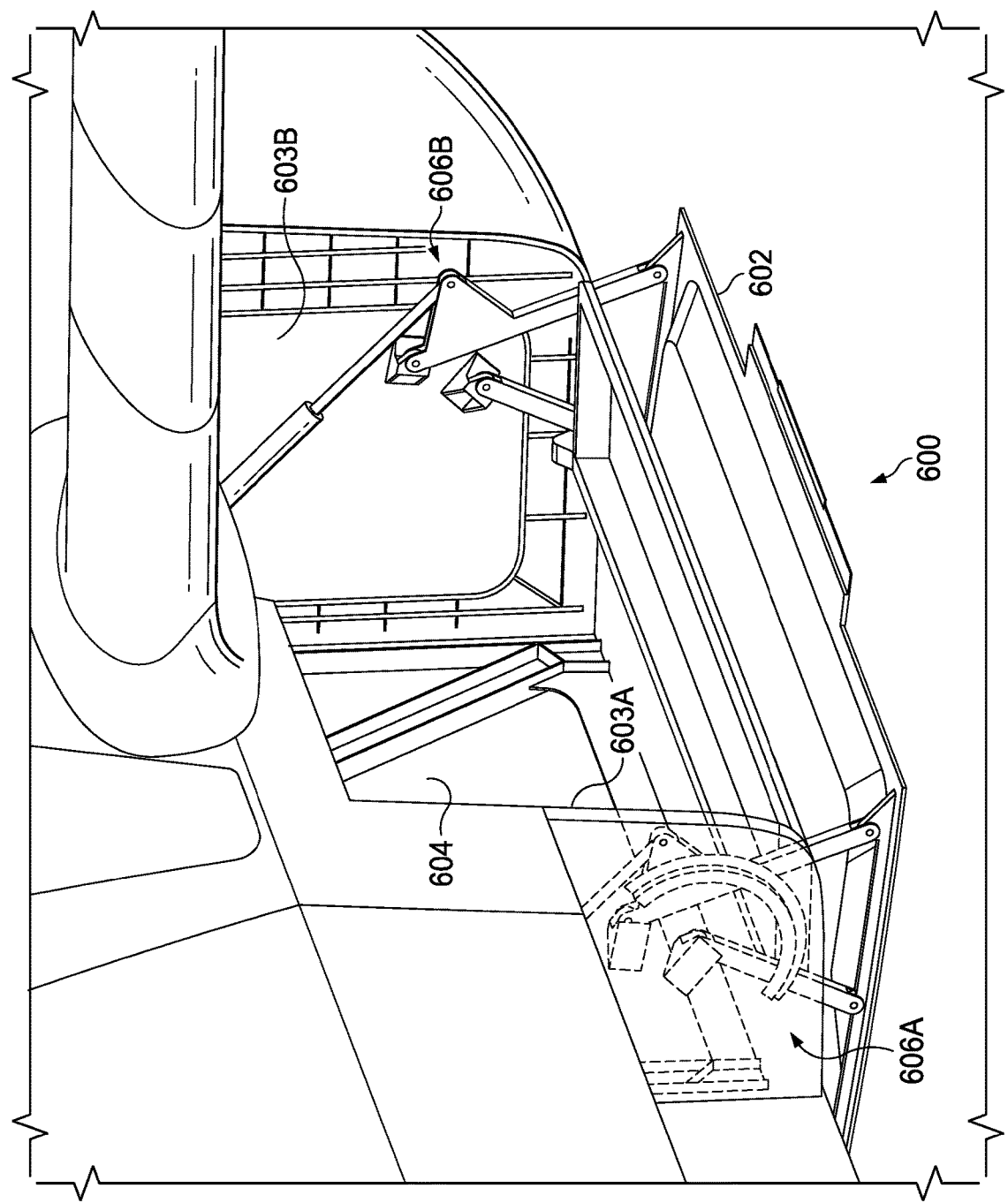

FIGS. 6A-6C illustrate an example payload door actuation mechanism for implementation in connection with the embodiments of the MDEPS described herein. At the outset, it should be recognized that the embodiment illustrated in FIGS. 6A-6C is only one of any number of payload door actuation mechanism that may be advantageously implemented in connection with embodiments described herein and that the illustrated embodiment is provided for purposes of example only.

In particular, FIGS. 6A-6C illustrate a four-bar payload door mechanism 600. The four-bar payload door mechanism 600 includes a single door panel 602 connected to forward and aft walls 603A, 603B of payload bay 604 via actuator mechanisms 606A, 606B (illustrated in greater detail with reference to FIGS. 7, 8A, and 8B). FIG. 6A illustrates the payload bay door panel 602 in a closed position. FIG. 6B illustrates the payload bay door panel 602 in a half open position. Finally, FIG. 6C illustrates the payload bay door panel 602 in a completely open position. In certain embodiments, slots in the belly skin of the aircraft (e.g., rotorcraft 100) are provided for receiving the lower link of the actuator mechanism and are provided with brush seals to guard against debris. In particular, based on the kinematics, the links sweep through a portion of the belly skin below the door, creating inboard/outboard slots in the skin to provide clearance for the links. Brush seals are used to close off that opening as much as possible when the door is closed.

Figure 7:
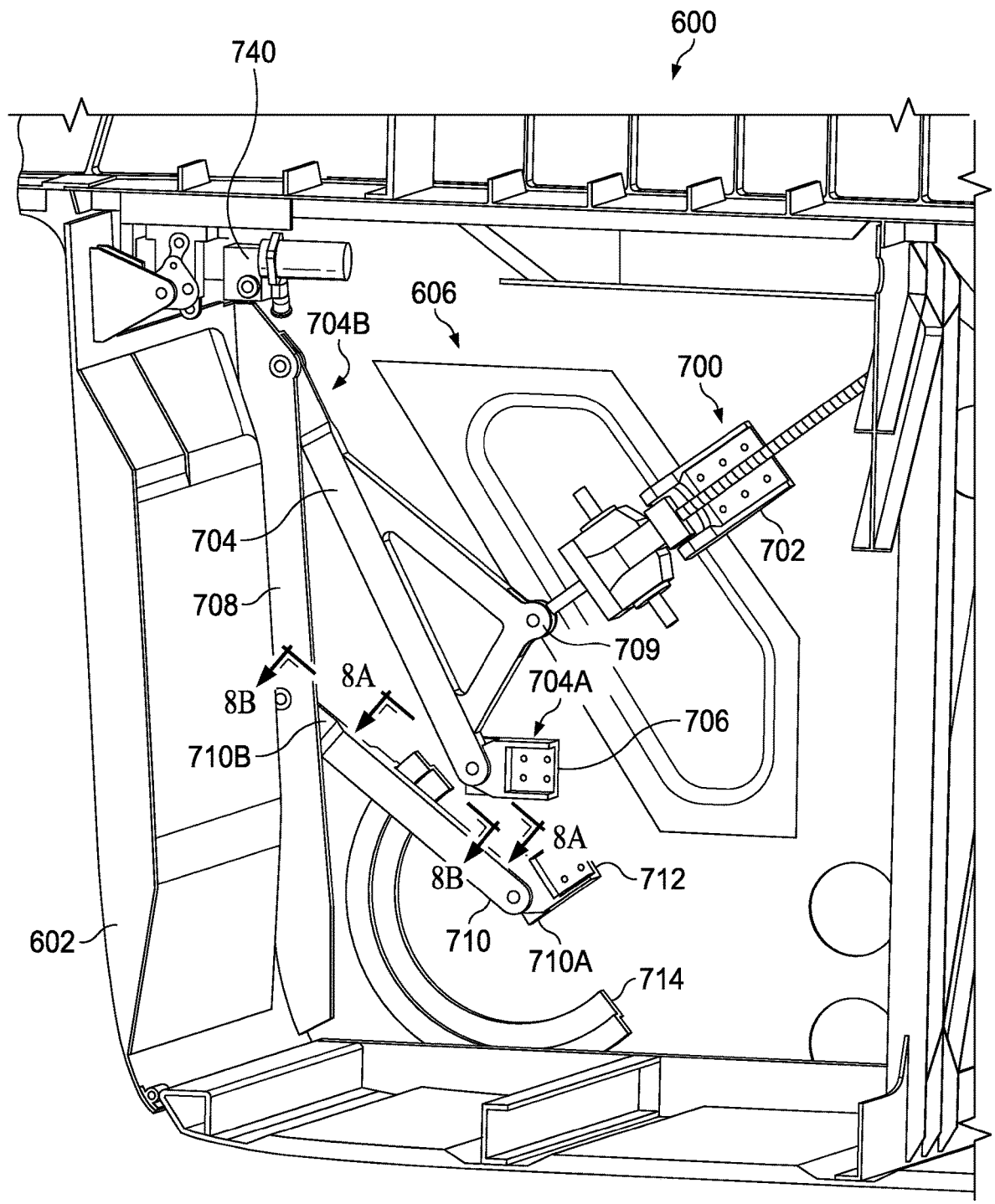
Figure 8A:
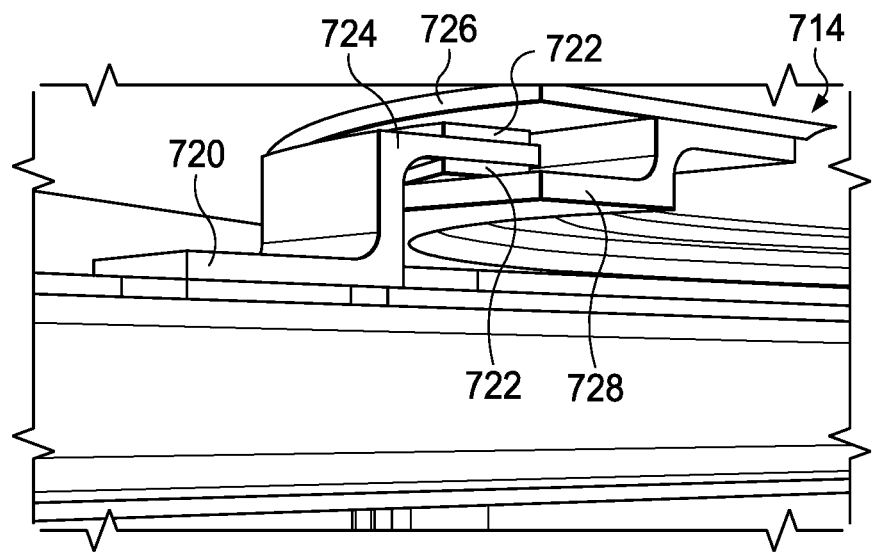
Figure 8B:
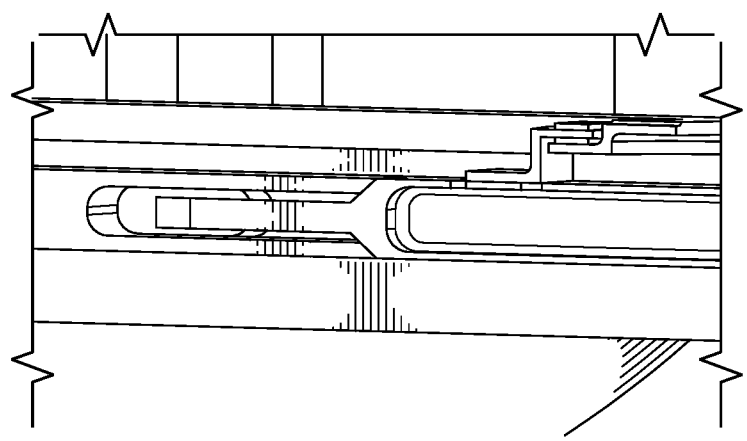

FIGS. 7, 8A, and 8B illustrate a forward actuator mechanism 606A of the four-bar payload door mechanism 600 in greater detail. Referring to FIG. 7, an actuator assembly 700, which may be implemented as a ball screw actuator, is mounted to the side wall of the payload bay via an actuator mount 702. A first end of an upper link 704, designated by a reference numeral 704A, is rotatably connected to a link mount 706 provided on the side wall of the payload bay. A second end of the upper link 704 opposite the first end 704A, designated by a reference numeral 704B, is rotatably connected to an attachment fitting 708 of the payload bay door panel 602. Upper link 704 is connected to actuator assembly 700 at a point 709 such that linear movement of the actuator assembly causes the upper link to move the door panel between open and closed positions depending on the position of the actuator assembly.

Similarly, a first end of a lower link 710, designated by a reference numeral 710A, is rotatably connected to a link mount 712 provided on the side wall of the payload bay. A second end of the lower link 710 opposite the first end 710A, designated by a reference numeral 710B, is rotatably attached to the attachment fitting 708. A curved track 714 is provided in the sidewall for engaging the lower link 710 to provide fore-aft load restraint for the door. In particular, as better shown in FIG. 7, the lower link 710 includes a zee bracket 720 having a wear pads 722 bonded to top and bottom surfaces of an upper flange 724 thereof, which flange 724 is received between an upper flange 726 and a lower flange 728 comprising the track 714 and moves along the track as the door panel 602 opens as shown in FIGS. 6A-6C.

As best shown in FIG. 7, uplocks, represented by an uplock 1640, are also provided maintaining the door 602 in a closed position when the MDEPS unit is retracted. It should be noted that although not shown, in certain embodiments, each door (represented by door 602) includes two uplocks per door; one forward (as shown in FIG. 7) and one aft (not shown in FIG. 7).

In operation, one or more of the operations of opening/closing the payload bay doors, causing the MDEPS units to be extended from the payload bay/retracted into the payload bay, and deploying the seats for use/folding the seats for storage may be performed automatically (e.g., using actuation systems) or manually. Moreover, the operations may be coordinated such that the issuance of a single command (e.g., by pressing a control button or activating a switch) results in sequential operations of the payload bay being opened, the MDEPS units being extended from the payload bay, and the seats being deployed, in that order, for example. Similarly, the issuance of a single command may result in the seats being stowed, the MDEPS unit being retracted into the payload bay, and the payload bay door being closed, in that order, for example.

FIGS. 9A-1, 9A-2, 9B, and 9C illustrate an alternative embodiment of an MDEPS unit 900 that includes a litter kit 902 on an outboard edge thereof, as well as a forward-facing seat 904 and an aft facing seat 906 (both of which are implemented using folding seats), such that the MDEPS unit 900 can accommodate two seated passengers and one prone passenger (e.g., an injured passenger). It will be recognized that MDEPS unit 900 may be deployed on one side of a rotorcraft while MDEPS unit 200 may be deployed on the opposite side of the rotorcraft, such that the rotorcraft may accommodate six seated passengers and one prone passenger. Alternatively, both sides of a rotorcraft may have MDEPS units 900 deployed thereon.

Figures 1, 9A:
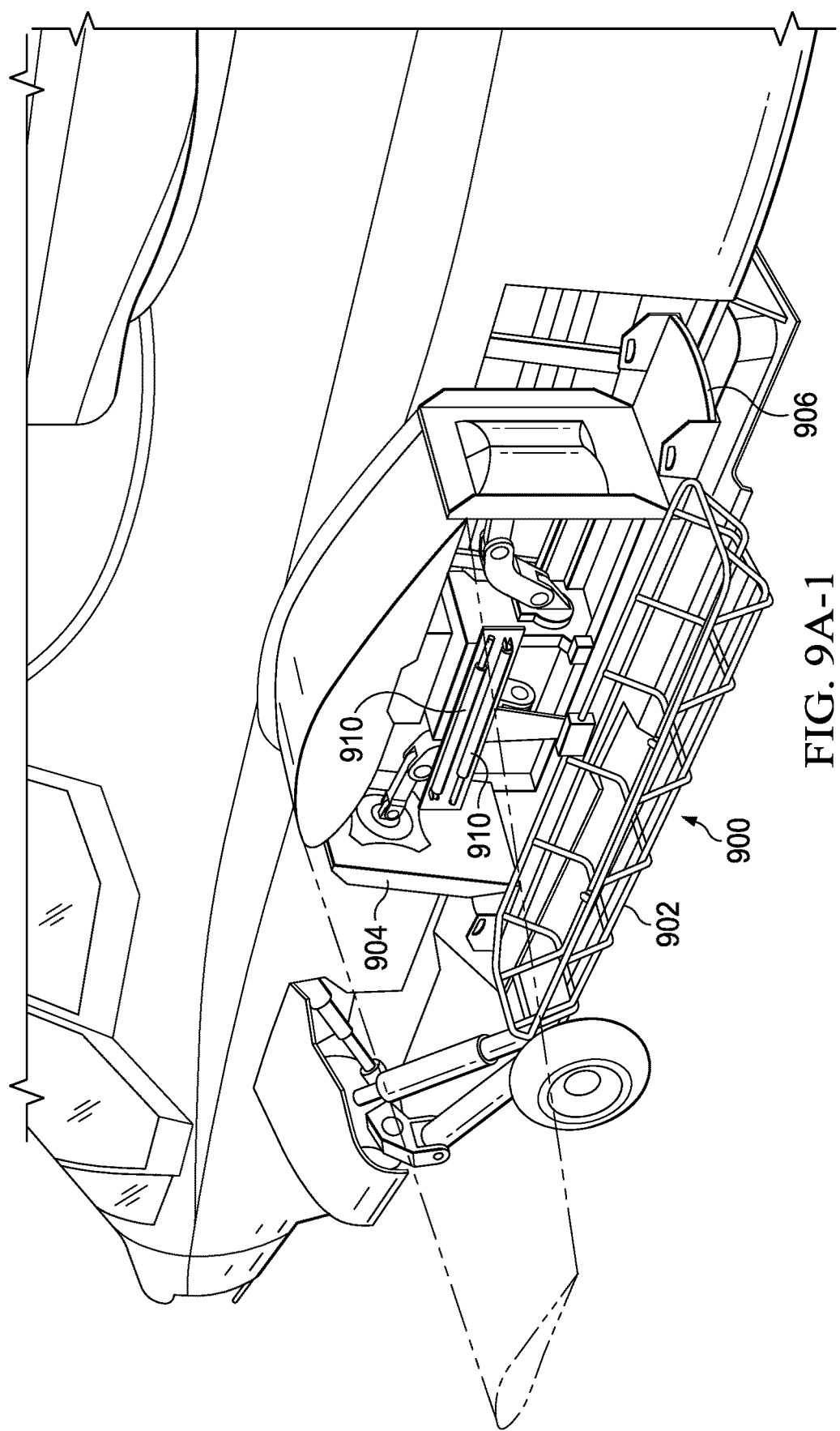
Figures 2, 9A:
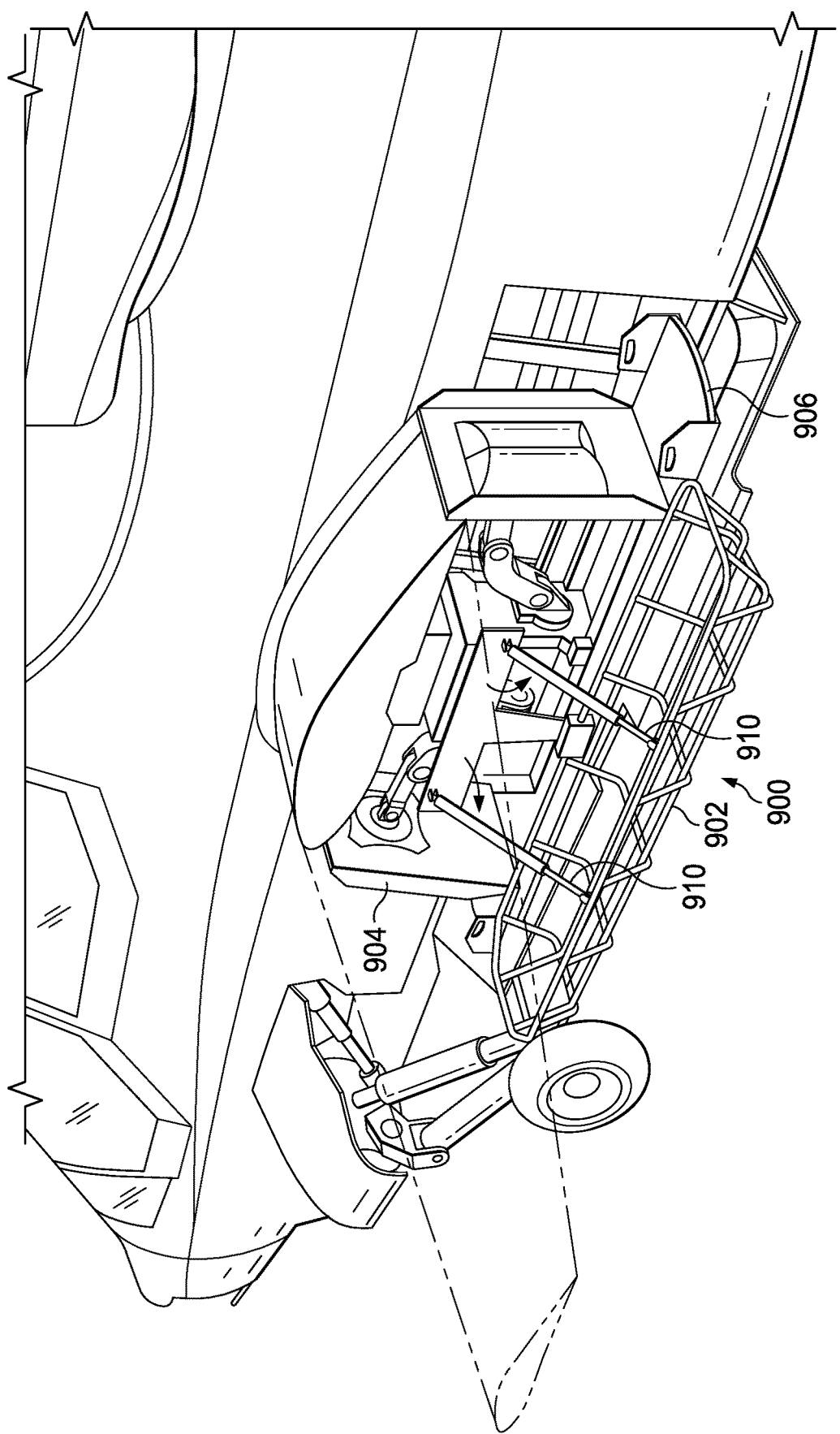
Figure 9B:
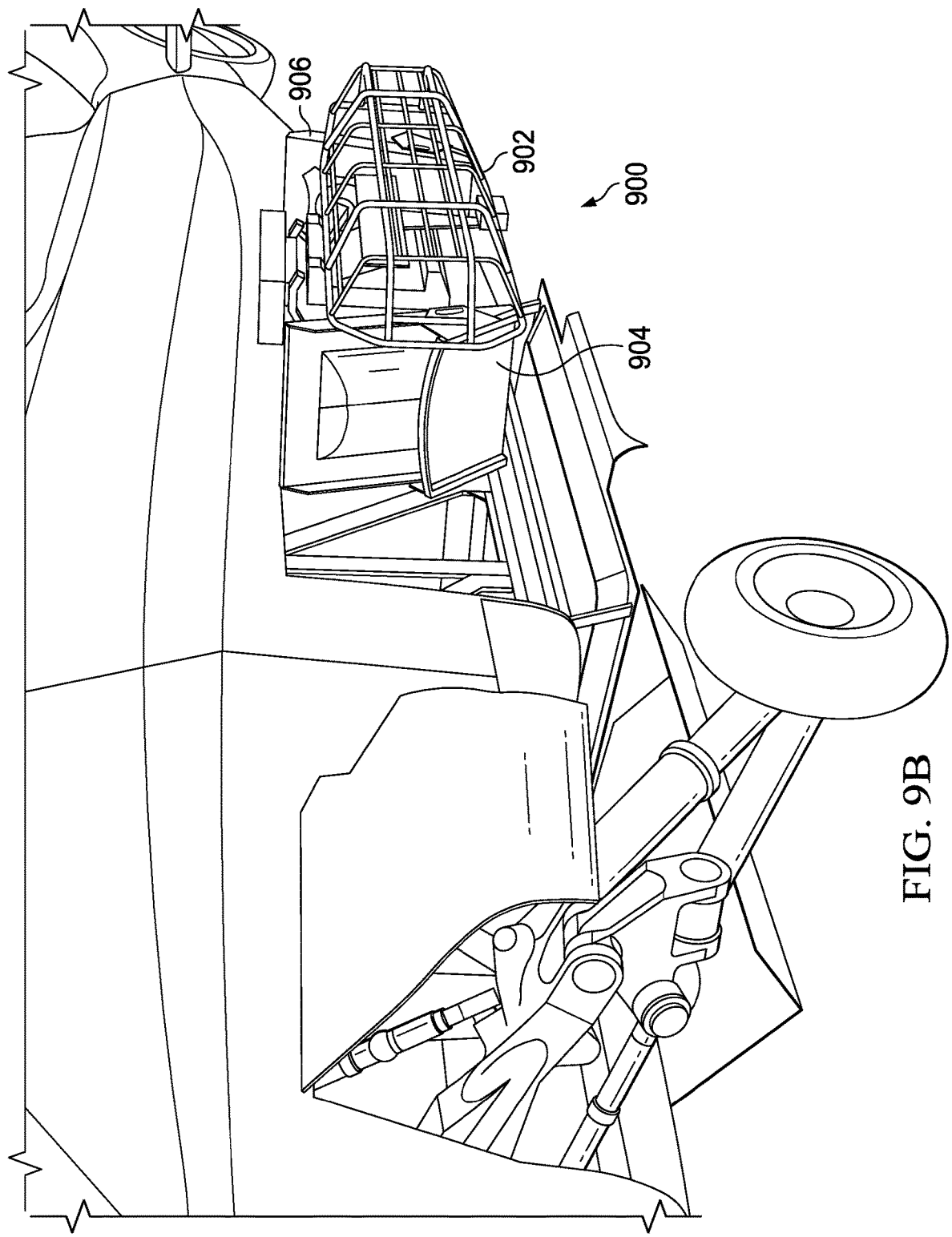
Figure 9C:
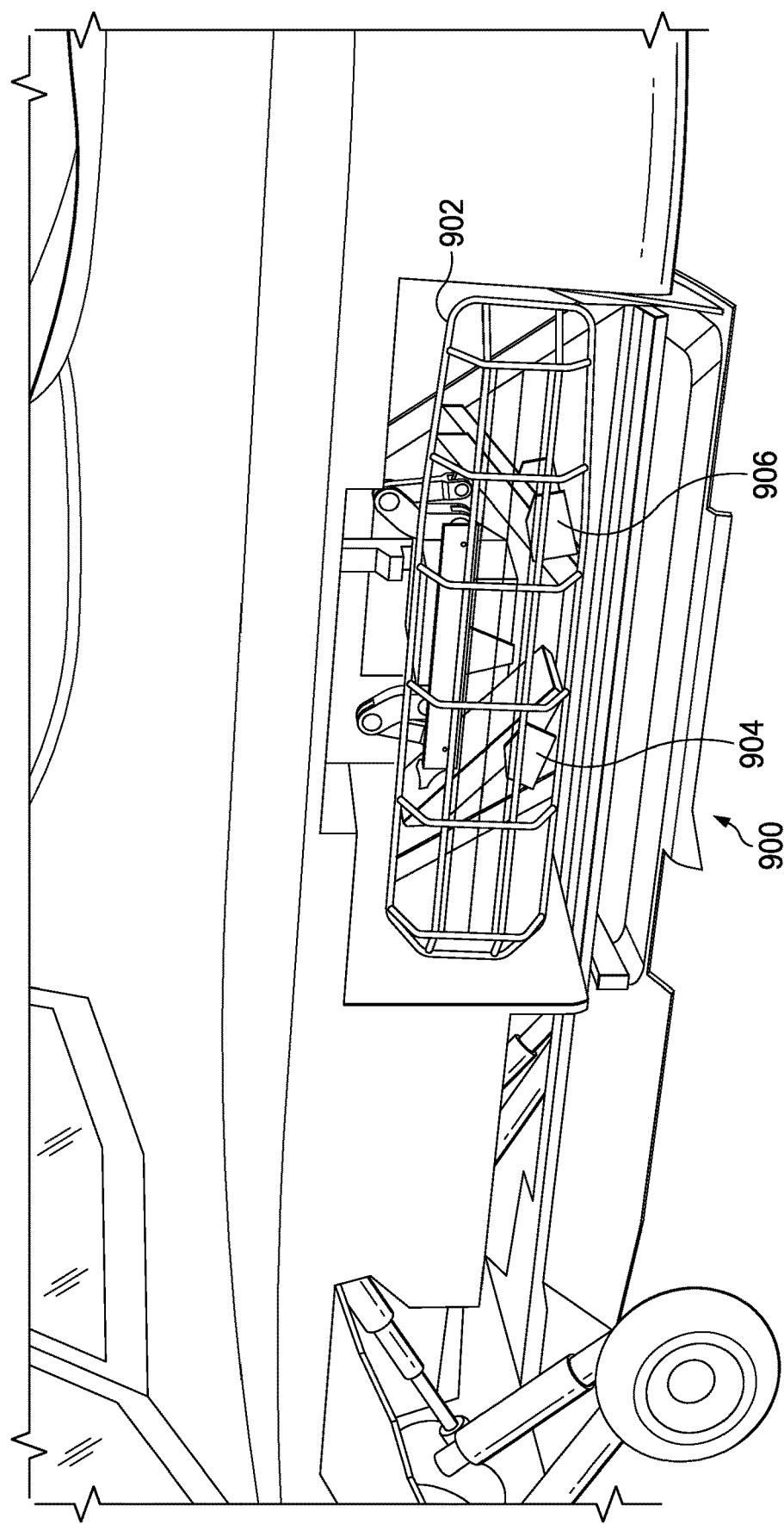

As shown in FIGS. 9A-1, 9A-2, 9B, and 9C, litter kit 902 rotates downward to an open position during deployment thereof (FIGS. 9A-1, 9A-2) and upward to a stowed position during stowage thereof (FIG. 9C). FIG. 9B illustrates an intermediate position of the litter kit 902 during transition between the open position and the closed position. Seats 904, 906, operate in the manner described above for forward-facing and aft-facing seats. In one embodiment, the litter kit 902 may be manually folded down by ground personnel. In the illustrated embodiment, supports 910 may be included for supporting the outboard edge of the litter kit 902 and may be implemented using struts or braces. As shown in FIGS. 9A-1 and 9A-2, it is unnecessary to remove outboard ends of wings when MDEPS 900 is deployed, as the litter kit 902 is arranged entirely beneath the wing and can be accommodated with the full wing in place. For purposes of clarity, the wing is not illustrated in FIGS. 9B and 9C.

Figure 10A:
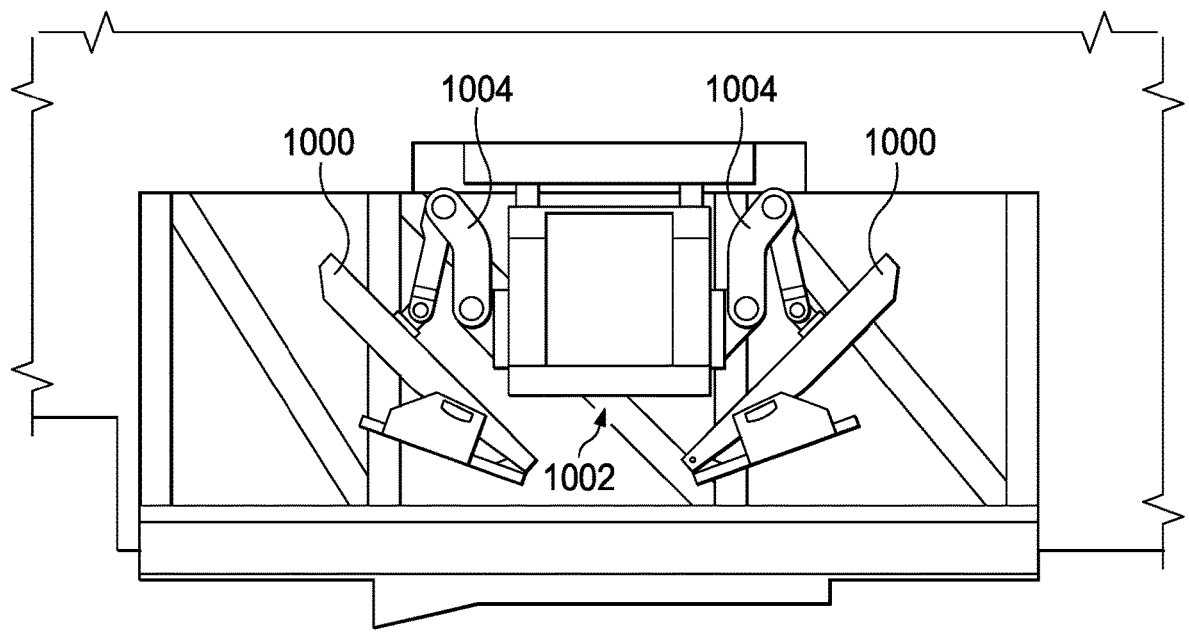
FIGS. 10A-10D illustrate deployment of forward and aft seats of an MDEPS unit in accordance with an example embodiment of the present disclosure.
Figure 10B:
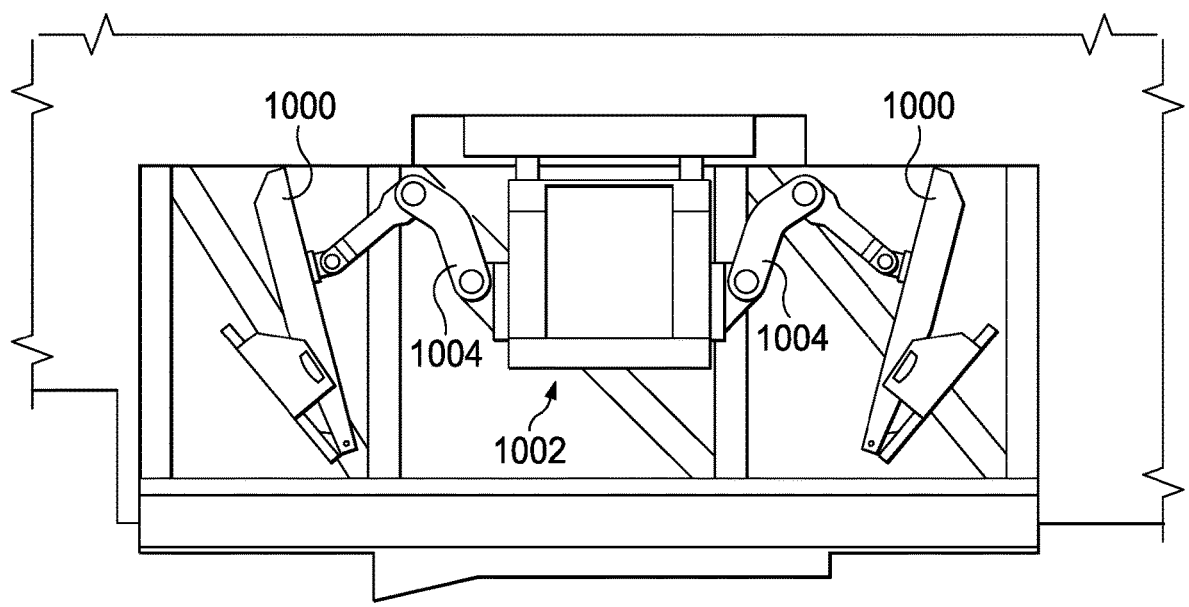
Figure 10C:
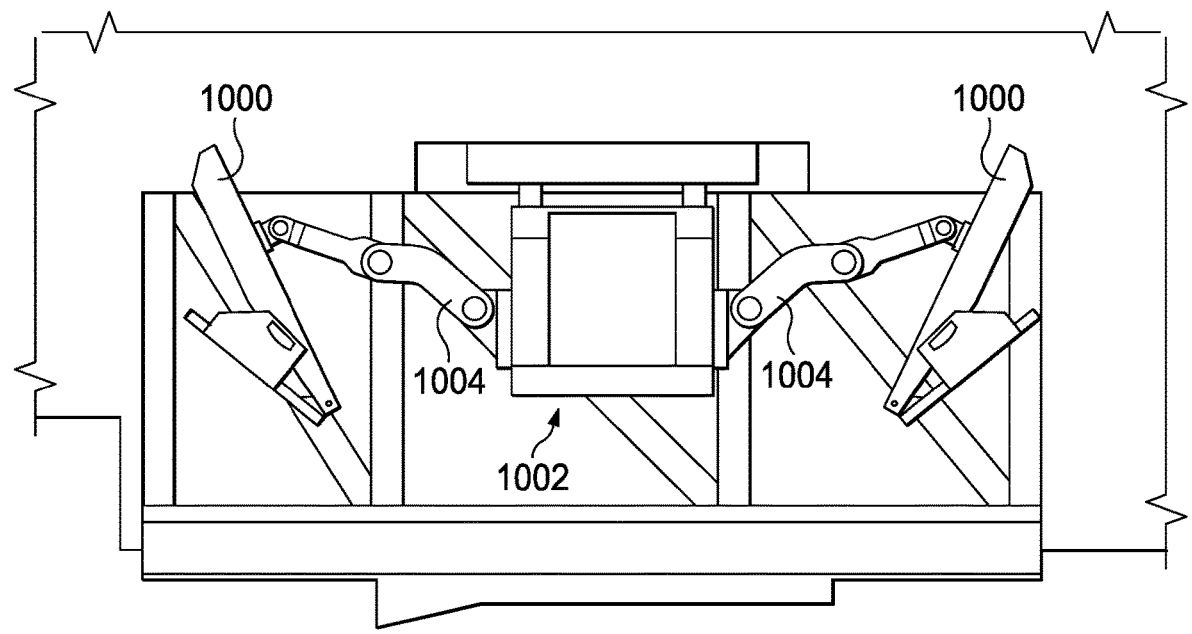
Figure 10D:
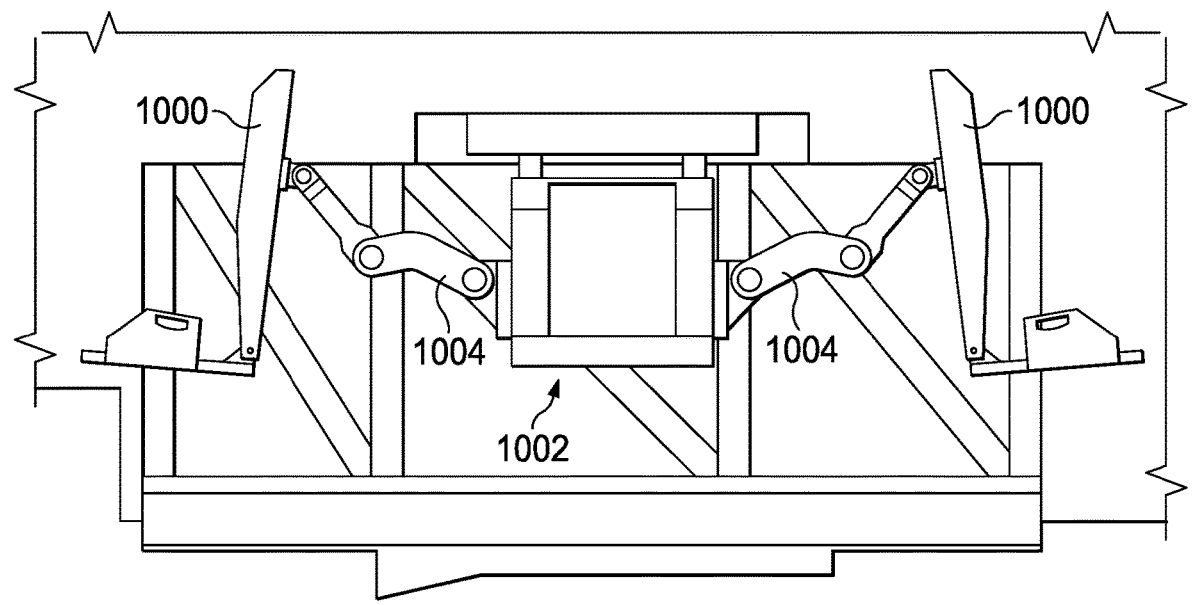

FIGS. 10A-10D illustrate example deployment of forward and aft seats 1000 of an MDEPS unit 1002 in accordance with one embodiment. For purposes of clarity, outboard seats of the MDEPS unit 1002 are not shown. In particular, FIGS. 10A-10D illustrate relative movement of triple joint arms 1004 from a first position, in which the seats 1000 are in an original position in which they may be stowed (FIG. 10A) in the payload bay through one or more intermediate positions (illustrated in FIGS. 10B, 10C) to a second (final) position in which the seats 1000 are fully deployed (FIG. 10D). The operations illustrated in FIGS. 10A-10D may be effected automatically (e.g., as a result of control signals issued to appropriate actuators, for examples) or manually (e.g., by a human operator). It will be recognized that stowage of the seats 1000 and MDEPS unit 1002 takes place in the opposite direction/order/sequence illustrated in FIGS. 10A-10D.

Figure 11A:
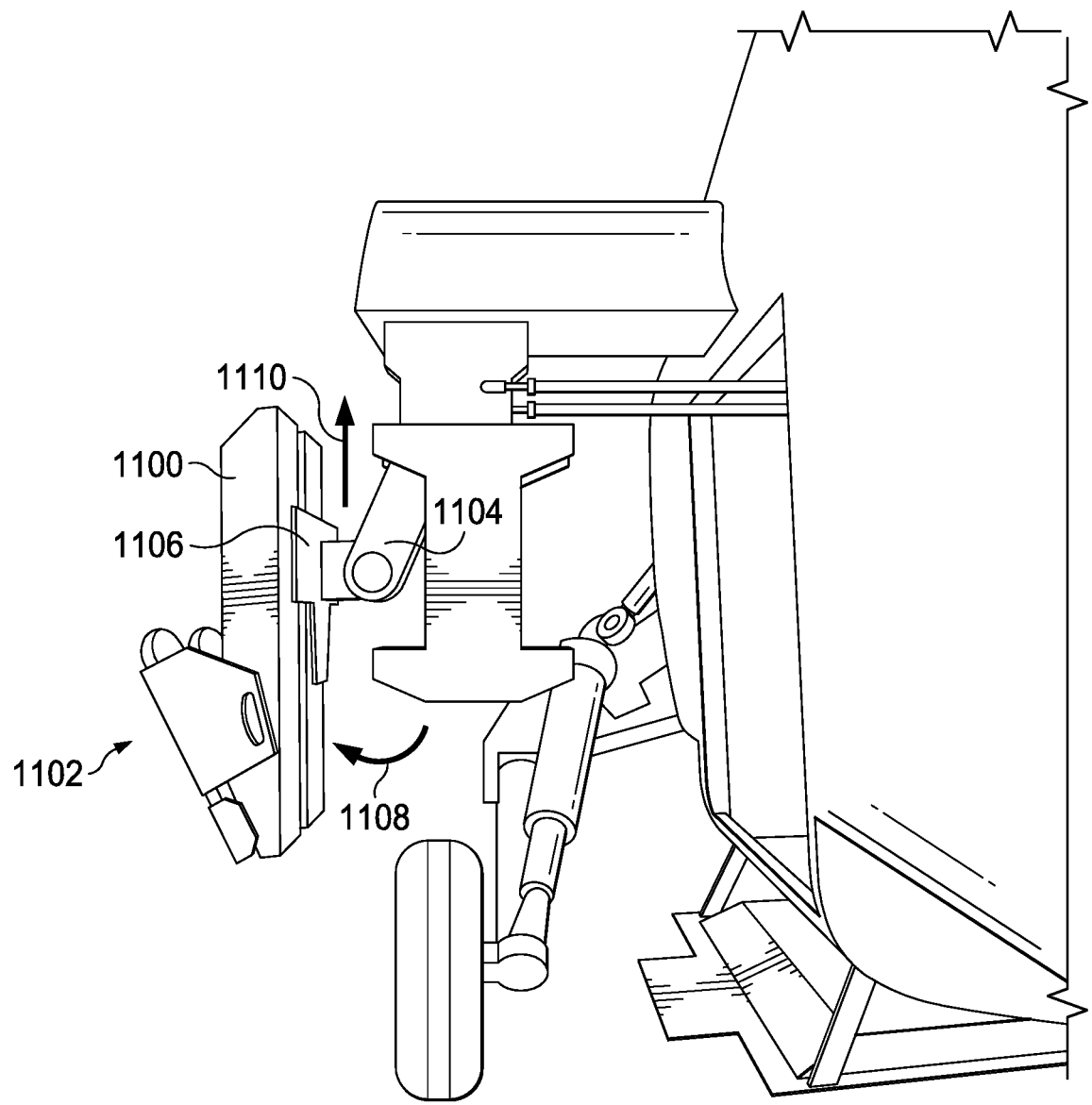
FIGS. 11A-11D illustrate deployment of outboard seats of an MDEPS unit in accordance with an example embodiment of the present disclosure.
Figure 11B:
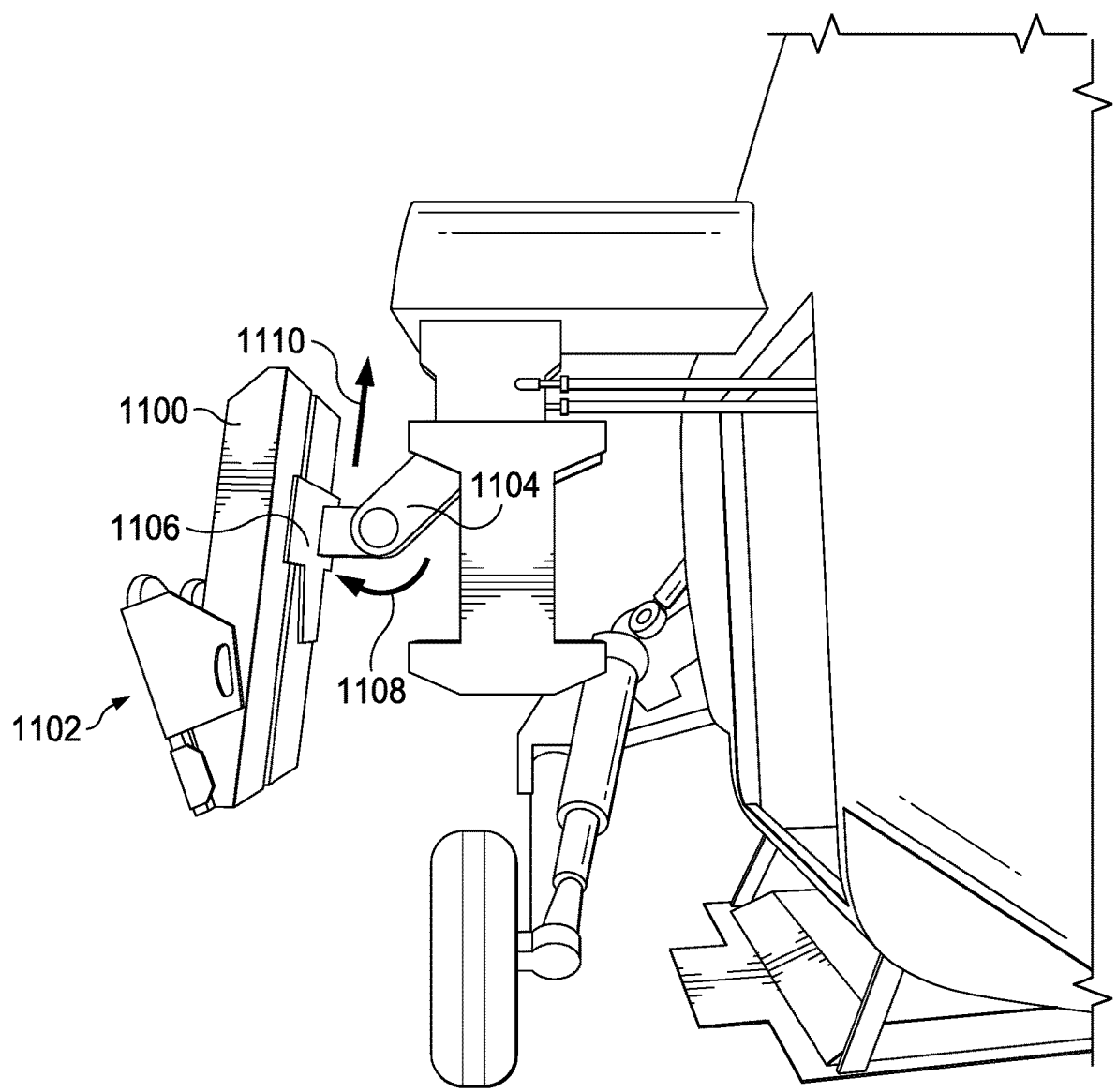
Figure 11C:
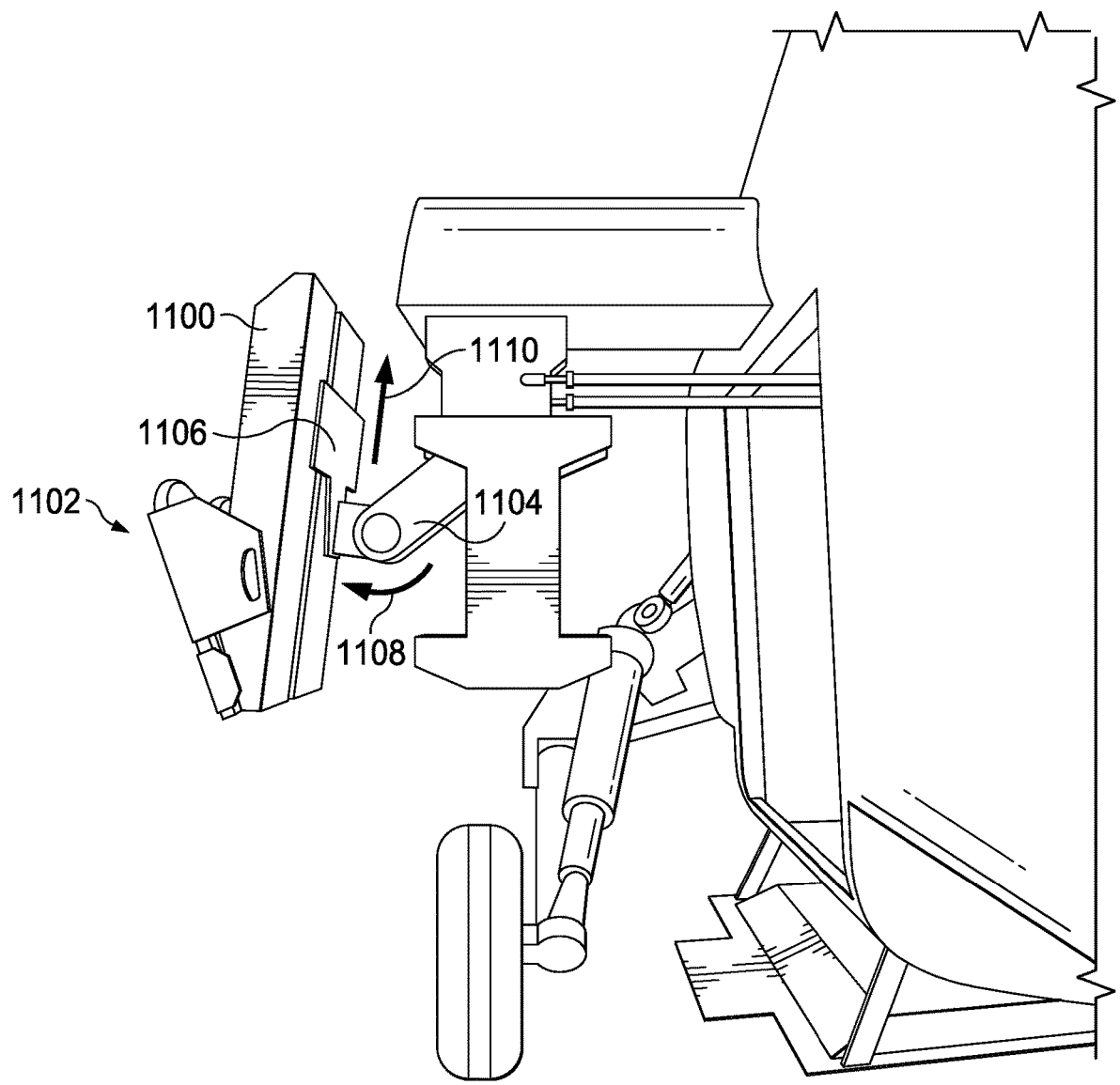
Figure 11D:
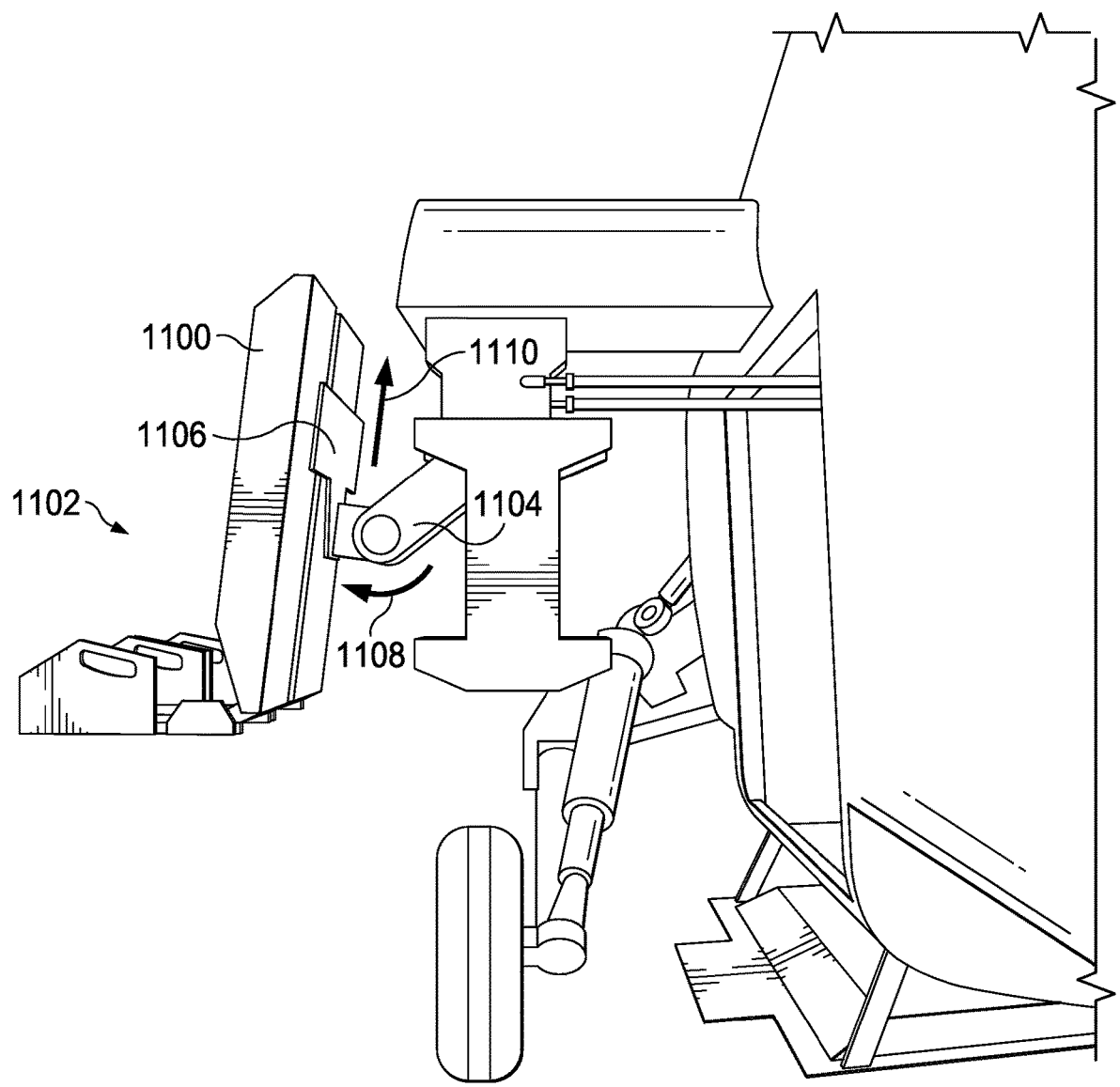

Similarly, FIGS. 11A-11D illustrate deployment of outboard seats 1100 of an MDEPS unit 1102 in accordance with one embodiment. For purposes of clarity, forward and aft seats of the MDEPS unit 1102 are not shown. In particular, FIGS. 11A-11D illustrate relative movement of a triple joint arm 1104 in combination with a pivoting tracked framework 1106 from a first position, in which the seats 1100 are stowed (FIG. 11A) through one or more intermediate positions (illustrated in FIGS. 11B, 11C) to a second (final) position in which the seats 1100 are fully deployed (FIG. 11D). It will be noted that combination of triple joint arm 1104 and framework 1106 result in generally rotational and linear movement of the seats, as represented in FIGS. 11A-11D by arrows 1108 and 1110. It will be recognized that stowage of the seats 1100 and MDEPS unit 1102 takes place in the opposite direction/order/sequence illustrated in FIGS. 11A-11D. The operations illustrated in FIGS. 11A-11D may be effected automatically (e.g., as a result of control signals issued to appropriate actuators, for examples) or manually (e.g., by a human operator).

It will be recognized that different types/arrangements of doors, as described herein, provide different clearances to the MDEPS units and/or the ground and require different actuation systems. Additionally, different door arrangements involve different levels of complexity. For example, some require more rollers or moving parts. Some of the configurations enable the door to be closed after the MDEPS units have been extended into the airstream. The decision to use one configuration versus another is dependent on the aircraft and its intended use, as well as the design space of cost, weight, complexity, and development time.

Example 1 is a system including an external passenger seating unit comprising at least one seat; and a translation mechanism for translating the external passenger seating unit between a first position in which the external passenger seating unit is stowed in a payload bay of an aircraft and a second position in which the external passenger seating unit is deployed external to the aircraft for accommodating at least one passenger.

In Example 2, the system of Example 1 may further include the at least one seat including a folding seat.

In Example 3, the system of any of Examples 1-2 may further include the at least one seat including at least one of an outboard-facing seat, a forward-facing seat, and an aft-facing seat.

In Example 4, the system of any of Examples 1-3 may further include the external passenger seating unit including a litter kit.

In Example 5, the system of any of Examples 1-4 may further include the translation mechanism including at least one of a linear actuator and a ball screw actuator.

In Example 6, the system of any of Examples 1-5 may further include a payload bay door for covering the payload bay; and a door actuator system for selectively opening and closing the payload bay door.

In Example 7, the system of any of Examples 1-6 may further include the door actuator system further including a door actuator assembly for coordinating the opening and closing of the payload bay door with movement of the external passenger seating unit between the first and second positions.

In Example 8, the system of any of Examples 1-7 may further include a door track assembly disposed on an interior surface of the payload bay door for engaging the door actuator system.

In Example 9, the system of any of Examples 1-8 may further include the external passenger seating unit further including a seat deployment mechanism for selectively transitioning the at least one seat between a deployed position for accommodating a passenger and a stowed position.

In Example 10, the system of any of Examples 1-9 may further include the seat deployment mechanism including a triple joint articulating arm for enabling rotary movement of the at least one seat relative to the aircraft.

In Example 11, the system of any of Examples 1-10 may further include the seat deployment mechanism enabling linear movement of the at least one seat relative to the aircraft.

Example 12 is an aircraft comprising a fuselage; a payload bay disposed within the fuselage; an external passenger seating unit comprising at least one seat; and a translation mechanism for translating the external passenger seating unit between a first position in which the external passenger seating unit is contained within the payload bay and a second position in which the external passenger seating unit is deployed external to the fuselage for accommodating at least one passenger.

In Example 13, the aircraft of Example 12 may further include the at least one seat including a folding seat.

In Example 14, the aircraft of any of Examples 12-13 may further include the at least one seat including at least one of an outboard-facing seat, a forward-facing seat, and an aft-facing seat.

In Example 15, the aircraft of any of Examples 12-14 may further include the external passenger seating unit including a litter kit.

In Example 16, the aircraft of any of Examples 12-16 may further include the translation mechanism including at least one of a linear actuator and a ball screw actuator.

In Example 17, the aircraft of any of Examples 12-16 may further include a payload bay door for covering the payload bay; and a door actuator system for selectively opening and closing the payload bay door.

In Example 18, the aircraft of any of Examples 12-17 may further include the external passenger seating unit further including a seat deployment mechanism for selectively transitioning the at least one seat between a deployed position for accommodating a passenger and a stowed position.

In Example 19, the aircraft of any of Examples 12-18 may further include the seat deployment mechanism including a triple joint articulating arm for enabling rotary movement of the at least one seat relative to the fuselage.

In Example 20, the aircraft of any of Examples 12-19 may further include the seat deployment mechanism enabling linear movement of the at least one seat relative to the fuselage.

Example 21 is a modular deployable external passenger seating ("MDEPS") unit comprising at least one seat and a mechanism for connecting the MDEPS to a translation assembly for translating the MDEPS between a first position in which the MDEPS is stowed in a payload bay of an aircraft and a second position in which the MDEPS is deployed external to the aircraft for accommodating at least one passenger.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A system comprising:
    an external passenger seating unit comprising at least one seat; and
    a translation mechanism for translating the external passenger seating unit between a first position in which the external passenger seating unit is stowed in a payload bay of an aircraft and a second position in which the external passenger seating unit is deployed external to the aircraft for accommodating at least one passenger;

wherein the aircraft is operable in an active flight mode when the external passenger seating unit is in the second position.

2. The system of claim 1, wherein the at least one seat comprises a folding seat.

3. The system of claim 1, wherein the at least one seat comprises at least one of an outboard-facing seat, a forward-facing seat, and an aft-facing seat.

4. The system of claim 1, wherein the external passenger seating unit comprises a litter kit.

5. The system of claim 1, wherein the translation mechanism comprises at least one of a linear actuator and a ball screw actuator.

6. The system of claim 1 further comprising:
a payload bay door for covering the payload bay; and
a door actuator system for selectively opening and closing the payload bay door.

7. The system of claim 6, wherein the door actuator system further comprises a door actuator assembly for coordinating the opening and closing of the payload bay door with movement of the external passenger seating unit between the first and second positions.

8. The system of claim 6 further comprising a door track assembly disposed on an interior surface of the payload bay for engaging the door actuator system.

9. The system of claim 1, wherein the external passenger seating unit further comprises a seat deployment mechanism for selectively transitioning the at least one seat between a deployed position for accommodating a passenger and a stowed position.

10. The system of claim 9, wherein the seat deployment mechanism comprises a triple joint articulating arm for enabling rotary movement of the at least one seat relative to the aircraft.

11. The system of claim 9, wherein the seat deployment mechanism enables linear movement of the at least one seat relative to the aircraft.

12. An aircraft comprising:
a fuselage;
a payload bay disposed within the fuselage;
an external passenger seating unit comprising at least one seat; and
a translation mechanism for translating the external passenger seating unit between a first position in which the external passenger seating unit is contained within the payload bay and a second position in which the external passenger seating unit is deployed external to the fuselage for accommodating at least one passenger;
wherein the aircraft is operable in an active flight mode when the external passenger seating unit is in the second position.

13. The aircraft of claim 12, wherein the at least one seat comprises a folding seat.

14. The aircraft of claim 12, wherein the at least one seat comprises at least one of an outboard-facing seat, a forward-facing seat, and an aft-facing seat.

15. The aircraft of claim 12, wherein the external passenger seating unit comprises a litter kit.

16. The aircraft of claim 12, wherein the translation mechanism comprises at least one of a linear actuator and a ball screw actuator.

17. The aircraft of claim 12 further comprising:
a payload bay door for covering the payload bay; and
a door actuator system for selectively opening and closing the payload bay door.

18. The aircraft of claim 12, wherein the external passenger seating unit further comprises a seat deployment mechanism for selectively transitioning the at least one seat between a deployed position for accommodating a passenger and a stowed position.

19. The aircraft of claim 18, wherein the seat deployment mechanism comprises a triple joint articulating arm for enabling rotary movement of the at least one seat relative to the aircraft.

20. A modular deployable external passenger seating ("MDEPS") unit comprising
at least one seat; and
a translation assembly for translating the MDEPS between a first position in which the MDEPS is stowed in a payload bay of an aircraft and a second position in which the MDEPS is deployed external to the aircraft for accommodating at least one passenger;
wherein the aircraft is operable in an active flight mode when the external passenger seating unit is in the second position.

* * * * *